(12) United States Patent
Gao et al.

(10) Patent No.: US 7,351,778 B2
(45) Date of Patent: Apr. 1, 2008

(54) CATALYST COMPONENT FOR OLEFIN POLYMERIZATION AND CATALYST COMPRISING THE SAME

(75) Inventors: Mingzhi Gao, Beijing (CN); Haitao Liu, Beijing (CN); Tianyi Li, Beijing (CN); Xianzhong Li, Beijing (CN); Changxiu Li, Beijing (CN); Jiyu Li, Beijing (CN); Lingyan Xing, Beijing (CN); Juxiu Yang, Beijing (CN); Jing Ma, Beijing (CN); Xiaodong Wang, Beijing (CN); Chunmin Ding, Beijing (CN)

(73) Assignees: China Petroleum & Chemical Corporation, Beijing (CN); Beijing Research Institute of Chemical Industry China Petroleum & Chemical Corporation, Beijing (CN)

( * ) Notice: Subject to any disclaimer, the term of this patent is extended or adjusted under 35 U.S.C. 154(b) by 19 days.

(21) Appl. No.: 11/117,093

(22) Filed: Apr. 28, 2005

(65) Prior Publication Data

US 2006/0287446 A1 Dec. 21, 2006

(30) Foreign Application Priority Data

Apr. 30, 2004 (CN) ............... 2004 1 0037418
Jan. 13, 2005 (CN) ............... 2005 1 0000481
Jan. 13, 2005 (CN) ............... 2005 1 0000482

(51) Int. Cl.
C08F 4/42 (2006.01)

(52) U.S. Cl. ............... 526/142; 526/348; 526/124.2; 526/124.3; 502/103; 502/125; 502/127

(58) Field of Classification Search ............... 526/348, 526/124.2, 124.3, 142; 502/103, 127, 125
See application file for complete search history.

(56) References Cited

U.S. PATENT DOCUMENTS 4,640,906 A    2/1987   Terano et al.
4,725,656 A *  2/1988   Kashiwa et al. ......... 526/125.3
5,166,113 A * 11/1992   Schwager et al. ........ 502/107
5,844,046 A * 12/1998   Ohgizawa et al. ........ 525/270

FOREIGN PATENT DOCUMENTS

CN    1223267    7/1999
CN    1453298    11/2003

* cited by examiner

Primary Examiner—Ling-Sui Choi
(74) Attorney, Agent, or Firm—Ladas & Parry LLP

(57) ABSTRACT

The present invention provides a catalyst component for polymerization of olefin $CH_2=CHR$, in which R is hydrogen or $C_1$-$C_{12}$ alkyl or aryl, comprising magnesium, titanium, a halogen and an electron donor compound (a) which is at least one selected from the group consisting of dibasic ester compounds of the formula (I), and said catalyst component optionally further comprising an electron donor compound (b) selected from the group consisting of aliphatic dicarboxylic esters and aromatic dicarboxylic esters, and/or an electron donor compound (c) selected from the group consisting of 1,3-diether compounds of formula (IV):

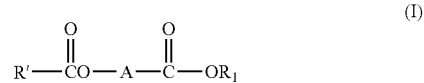

(I)

wherein, $R_1$, R' and A are as defined in the description,

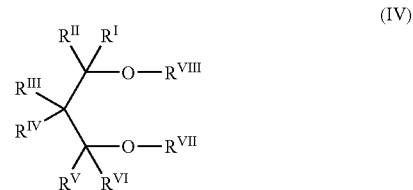

(IV)

wherein $R^I$-$R^{VIII}$ are as defined in the description, and a catalyst comprising the catalyst component.

27 Claims, No Drawings

CATALYST COMPONENT FOR OLEFIN POLYMERIZATION AND CATALYST COMPRISING THE SAME

CROSS REFERENCE OF RELATED APPLICATION

The present application claims the benefit of the Chinese Patent Application Nos. 2004100374186 filed on Apr. 30, 2004, 2005100004821 filed on Jan. 13, 2005, and 2005100004817 filed on Jan. 13, 2005, which are incorporated herein by reference in their entirety and for all purposes.

FIELD OF THE INVENTION

The present invention relates to a solid catalyst component for olefin polymerization comprising a dibasic ester compound having a specific structure, a catalyst comprising the same, and use of said catalyst in polymerization of olefin $CH_2=CHR$, in which R is hydrogen or $C_1$-$C_{12}$ alkyl or aryl group. In particular, when the catalyst is used in polymerization of propylene, polymer with higher isotacticity and broader molecular weight distribution can be obtained in higher yield.

BACKGROUND ART OF THE INVENTION

It is well known that solid titanium catalyst component with magnesium, titanium, halogen and electron donor as basic compositions can be used in the polymerization of olefin $CH_2=CHR$, especially in the polymerization of alpha-olefins having 3 or more carbon atoms, higher isotactic polymer can be obtained in higher yield. An electron donor (ED) compound is one of indispensable compositions of catalyst component, and with the development of internal ED compound, polyolefin catalyst is continuously renovated.

At present, a large number of various ED compounds have been disclosed, for instance, polycarboxylic acids, monocarboxylic esters or polycarboxylic esters, anhydrides, ketones, monoethers or polyethers, alcohols, amines, and their derivatives, among of which aromatic dicarboxylic esters, such as di-n-butyl phthalate or diisobutyl phthalate (cf. CN85100997A), are commonly used. See also EP 0045977 (phthalates); CN1042547A, EP0361493, EP0728724 (1,3-diether compounds); CN1054139A, CN1105671A (1,3-diketone compounds); CN1236732, CN1236733, CN1236734, CN1292800 (specific substituted malonates), PCT International Application WO 0063261 (succinates), PCT International Application WO0055215 (β-substituted glutarates), CN1242780 (cyano-esters), CN1087918 (diamines), PCT International Application W003022894 (maleates), CN1436766A, CN1436796A (a specific kind of polyol esters) for ED compounds.

However, the catalysts disclosed in above-mentioned publications have some disadvantages in use of olefin polymerization. The present inventors have surprisingly found that catalysts for olefin polymerization exhibiting excellent general performance can be obtained by using a novel dibasic ester compound as internal ED. When used in propylene polymerization, the catalysts exhibit satisfied polymerization activity and good hydrogen response, and the resulting polymers have higher stereoselectivity and broader molecular weight distribution (MWD). These properties are desired in the development of different grades of polymers.

In addition, in the prior art, one approach commonly used to improve general performance of catalysts is to use more than one ED compounds in the preparation of the catalysts. For instance, CN1268957A discloses the use of two ED compounds in the preparation of catalysts, wherein one ED compound is selected from the group consisting of ether compounds containing two or more ether bonds, and the other is selected from the group consisting of ester compounds of monocarboxylic acids or polycarboxylic acids. The prepared catalysts exhibit higher polymerization activity, and the resultant polypropylene resins have higher content of insolubles in xylene and lower crystallinity, so that the polymers are suitable to prepare bi-oriented polypropylene film (BOPP). For another example, WO03/002617 proposes to add at first a minor amount of monofuntional compound, for example ethyl benzoate, followed by the addition of another ED compound in the preparation of a catalyst. Although the obtained catalyst contains little or undetectable said monofuntional compound, it exhibits improved catalytic activity and melt flow index property. Although the properties of the catalysts are improved by these methods in some extent, the catalysts are still unsatisfactory in terms of MWD of the polymers.

The present inventors have found that catalyst components and catalysts exhibiting excellent general performance can be obtained by using said dibasic ester compound and a 1,3-diether compound or a phthalate ester compound as internal ED in the catalyst for olefin polymerization. When used in olefin polymerization, especially in propylene polymerization, the catalysts exhibit higher polymerization activity, and the resulting polymers have broader MWD.

THE DESCRIPTION OF THE INVENTION

One object of the invention is to provide a catalyst component for polymerization of olefin $CH_2=CHR$, wherein R is hydrogen or $C_1$-$C_{12}$ alkyl or aryl group, comprising magnesium, titanium, a halogen and an electron donor compound (a), wherein said electron donor compound (a) is at least one selected from the group consisting of dibasic ester compounds of the formula (I):

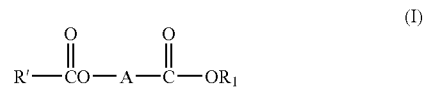

wherein, $R_1$ and R' groups, which may be identical or different, can be selected from the group consisting of substituted or unsubstituted, $C_1$-$C_{20}$ linear or branched alkyl, $C_3$-$C_{20}$ cycloalkyl, $C_6$-$C_{20}$ aryl, $C_7$-$C_{20}$ alkaryl, $C_7$-$C_{20}$ aralkyl, $C_2$-$C_{10}$ alkenyl, and $C_{10}$-$C_{20}$ condensed aromatic group; A is a bivalent linking group with chain length between two free radicals being 1-10 carbon atoms, one or more carbon atoms of the bivalent linking group can be replaced by a hetero-atom selected from the group consisting of nitrogen, oxygen, sulfur, silicon, and phosphorus, and carbon atom(s) and optional hetero-atom(s) of the bivalent linking group can carry a substituent selected from linear or branched alkyl, cycloalkyl, aryl, alkaryl, aralkyl, alkenyl, condensed aromatic group, and ester group, said substituents having from 1 to 20 carbon atoms, and two or more said substituents being optionally linked together to form saturated or unsaturated monocyclic or polycyclic ring.

The term "polymerization" as used herein intends to include homopolymerization and copolymerization. The term "polymer" as used herein intends to include homopolymer, copolymer and terpolymer.

The term "catalyst component" as used herein intends to mean main catalyst component or pre-catalyst, which, together with cocatalyst component and optional external ED compound, forms catalyst for olefin polymerization.

In a preferred embodiment of the present invention, in the formula (I), $R_1$ and $R'$ groups, which may be identical or different, can be selected from the group consisting of substituted or unsubstituted, $C_1$-$C_{10}$ linear or branched alkyl, $C_6$-$C_{10}$ aryl, $C_7$-$C_{10}$ alkaryl, and $C_7$-$C_{10}$ aralkyl. More preferably, in the formula (I), $R'$ group is selected from the group consisting of $C_6$-$C_{10}$ aryl, $C_7$-$C_{10}$ alkaryl, and $C_7$-$C_{10}$ aralkyl.

In another preferred embodiment of the present invention, in the formula (I), A is a bivalent linking group with chain length between two free radicals being 1-6 carbon atoms, and carbon atom(s) of the bivalent linking group can carry a substituent selected from linear or branched $C_1$-$C_{10}$ alkyl, $C_3$-$C_{10}$ cycloalkyl, $C_6$-$C_{10}$ aryl, $C_7$-$C_{10}$ alkaryl, $C_7$-$C_{10}$ aralkyl, and $C_2$-$C_{10}$ alkenyl.

In still another preferred embodiment of the present invention, in the dibasic ester compounds of the formula (I) as ED compound (a), A is a bivalent linking group with chain length between two free radicals being 2 carbon atoms, and $R'$ group is selected from the group consisting of substituted or unsubstituted, $C_6$-$C_{20}$ aryl, $C_7$-$C_{20}$ alkaryl, and $C_7$-$C_{20}$ aralkyl.

In a more preferred embodiment of the present invention, ED compound (a) is selected from the group consisting of dibasic ester compounds of formula (II):

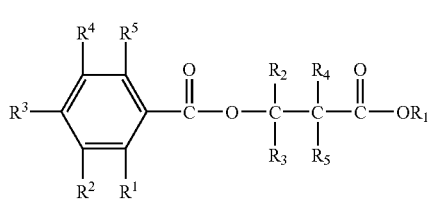

(II)

wherein $R_1$ is $C_1$-$C_{20}$ unsubstituted or halogen-substituted alkyl, or $C_6$-$C_{20}$ unsubstituted or halogen-substituted aryl or alkaryl;

$R_{2-5}$, which may be identical or different, are hydrogen or $C_1$-$C_4$ linear or branched alkyl;

$R^{1-5}$, which may be identical or different, are hydrogen, halogen, $C_1$-$C_{10}$ unsubstituted or halogen-substituted alkyl, or $C_6$-$C_{20}$ unsubstituted or halogen-substituted aryl or alkaryl or aralkyl.

The halogen is selected from the group consisting of F, Cl and Br.

In the formula (II), $R_1$ is preferably $C_2$-$C_{10}$ linear or branched alkyl or $C_6$-$C_{20}$ alkaryl, and more preferably $C_2$-$C_6$ linear or branched alkyl such as ethyl, propyl, isopropyl, butyl, iso-butyl, tert-butyl, pentyl, isopentyl, hexyl, and the like.

In the formula (II), $R^{1-5}$ groups, which may be identical or different, are preferably hydrogen, or $C_1$-$C_6$ linear or branched, unsubstituted or halogen-substituted alkyl such as methyl, ethyl, propyl, isopropyl, butyl, iso-butyl, tert-butyl, pentyl, isopentyl, hexyl and the like.

Examples of the dibasic ester compounds include, but are not limited to:

Ethyl 3-benzoyloxybutyrate, ethyl 2-methyl-3-benzoyloxybutyrate, ethyl 2-ethyl-3-benzoyloxybutyrate, ethyl 2-n-propyl-3-benzoyloxybutyrate, ethyl 2-allyl-3-benzoyloxybutyrate, ethyl 2-isopropyl-3-benzoyloxybutyrate, ethyl 2-n-butyl-3-benzoyloxybutyrate, ethyl 2-iso-butyl-3-benzoyloxybutyrate, ethyl 2-tert-butyl-3-benzoyloxybutyrate, ethyl 2-benzyl-3-benzoyloxybutyrate, ethyl 2,2-dimethyl-3-benzoyloxybutyrate, ethyl 3-benzoyloxyvalerate, ethyl 2-methyl-3-benzoyloxyvalerate, ethyl 2-ethyl-3-benzoyloxyvalerate, ethyl 2-n-propyl-3-benzoyloxyvalerate, ethyl 2-allyl-3-benzoyloxyvalerate, ethyl 2-isopropyl-3-benzoyloxyvalerate, ethyl 2-n-butyl-3-benzoyloxyvalerate, ethyl 2-iso-butyl-3-benzoyloxyvalerate, ethyl 2-tert-butyl-3-benzoyloxyvalerate, ethyl 2-benzyl-3-benzoyloxyvalerate, ethyl 2,2-dimethyl-3-benzoyloxyvalerate, ethyl 3-benzoyloxycaproate, ethyl 2-methyl-3-benzoyloxycaproate, ethyl 2-ethyl-3-benzoyloxycaproate, ethyl 2-n-propyl-3-benzoyloxycaproate, ethyl 2-allyl-3-benzoyloxycaproate, ethyl 2-isopropyl-3-benzoyloxycaproate, ethyl 2-n-butyl-3-benzoyloxycaproate, ethyl 2-iso-butyl-3-benzoyloxycaproate, ethyl 2-tert-butyl-3-benzoyloxycaproate, ethyl 2-benzyl-3-benzoyloxycaproate, isopropyl 3-benzoyloxybutyrate, isopropyl 2-methyl-3-benzoyloxybutyrate, isopropyl 2-ethyl-3-benzoyloxybutyrate, isopropyl 2-n-propyl-3-benzoyloxybutyrate, isopropyl 2-allyl-3-benzoyloxybutyrate, isopropyl 2-isopropyl-3-benzoyloxybutyrate, isopropyl 2-n-butyl-3-benzoyloxybutyrate, isopropyl 2-iso-butyl-3-benzoyloxybutyrate, isopropyl 2-tert-butyl-3-benzoyloxybutyrate, isopropyl 2-benzyl-3-benzoyloxybutyrate, isopropyl 2,2-dimethyl-3-benzoyloxybutyrate, isobutyl 3-benzoyloxybutyrate, isobutyl 2-methyl-3-benzoyloxybutyrate, isobutyl 2-ethyl-3-benzoyloxybutyrate, isobutyl 2-n-propyl-3-benzoyloxybutyrate, isobutyl 2-allyl-3-benzoyloxybutyrate, isobutyl 2-isopropyl-3-benzoyloxybutyrate, isobutyl 2-n-butyl-3-benzoyloxybutyrate, isobutyl 2-iso-butyl-3-benzoyloxybutyrate, isobutyl 2-tert-butyl-3-benzoyloxybutyrate, isobutyl 2-benzyl-3-benzoyloxybutyrate, isobutyl 2,2-dimethyl-3-benzoyloxybutyrate, methyl 3-benzoyloxybutyrate, methyl 2-methyl-3-benzoyloxybutyrate, methyl 2-ethyl-3-benzoyloxybutyrate, methyl 2-n-propyl-3-benzoyloxybutyrate, methyl 2-allyl-3-benzoyloxybutyrate, methyl 2-isopropyl-3-benzoyloxybutyrate, methyl 2-n-butyl-3-benzoyloxybutyrate, methyl 2-iso-butyl-3-benzoyloxybutyrate, methyl 2-tert-butyl-3-benzoyloxybutyrate, methyl 2-benzyl-3-benzoyloxybutyrate, methyl 2,2-dimethyl-3-benzoyloxybutyrate, ethyl 3-cinnamoyloxybutyrate, ethyl 2-methyl-3-cinnamoyloxybutyrate, ethyl 2-ethyl-3-cinnamoyloxybutyrate, ethyl 2-n-propyl-3-cinnamoyloxybutyrate, ethyl 2-allyl-3-cinnamoyloxybutyrate, ethyl 2-isopropyl-3-cinnamoyloxybutyrate, ethyl 2-n-butyl-3-cinnamoyloxybutyrate, ethyl 2-iso-butyl-3-cinnamoyloxybutyrate, ethyl 2-tert-butyl-3-cinnamoyloxybutyrate, ethyl 2-benzyl-3-cinnamoyloxybutyrate, ethyl 2,2-dimethyl-3-cinnamoyloxybutyrate, ethyl 3-cinnamoyloxyvalerate, ethyl 2-methyl-3-cinnamoyloxyvalerate, ethyl 2-ethyl-3-cinnamoyloxyvalerate, ethyl 2-n-propyl-3-cinnamoyloxyvalerate, ethyl 2-allyl-3-cinnamoyloxyvalerate, ethyl 2-isopropyl-3-cinnamoyloxyvalerate, ethyl 2-n-butyl-3-cinnamoyloxyvalerate, ethyl 2-iso-butyl-3-cinnamoyloxyvalerate, ethyl 2-tert-butyl-3-cinnamoyloxyvalerate, ethyl 2-benzyl-3-cinnamoyloxyvalerate, ethyl 2,2-dimethyl-3-cinnamoyloxyvalerate, ethyl 3-cinnamoyloxycaproate, ethyl 2-methyl-3-cinnamoyloxycaproate, ethyl 2-ethyl-3-cinnamoyloxycaproate, ethyl 2-n-propyl-3-cinnamoyloxycaproate, ethyl 2-allyl-3-cinnamoyloxycaproate, ethyl 2-isopropyl-3-cinnamoyloxycaproate, ethyl 2-n-butyl-3-cinnamoyloxycaproate, ethyl 2-iso-butyl-3-cinnamoyloxycaproate, ethyl 2-tert-butyl-3-cinnamoyloxycaproate, ethyl 2-benzyl-3-cinnamoyloxycaproate, ethyl 2,2-dimethyl-3-cinnamoyloxycaproate, isopropyl 3-cinnamoyloxybutyrate, isopropyl 2-methyl-3-cinnamoyloxybutyrate, isopropyl 2-ethyl-3-cinnamoyloxybutyrate, isopropyl 2-n-propyl-3-cinnamoyloxybutyrate, isopropyl 2-allyl-3-cinnamoyloxybutyrate, isopropyl 2-isopropyl-3-cinnamoyloxybutyrate, isopropyl 2-n-butyl-3-cinnamoyloxybutyrate, isopropyl 2-iso-butyl-3-cinnamoyloxybutyrate, isopropyl 2-tert-butyl-3-cinnamoyloxybutyrate, isopropyl 2-benzyl-3-cinnamoyloxybutyrate, isopropyl 2,2-dimethyl-3-cinnamoyloxybutyrate, isobutyl 3-cinnamoyloxybutyrate, isobutyl 2-methyl-3-cinnamoyloxybutyrate, isobutyl 2-ethyl-3-cinnamoyloxybutyrate, isobutyl 2-n-propyl-3-cinnamoyloxybutyrate, isobutyl 2-allyl-3-cinnamoyloxybutyrate, isobutyl 2-isopropyl-3-cinnamoyloxybutyrate, isobutyl 2-n-butyl-3-cinnamoyloxybutyrate, isobutyl 2-iso-butyl-3-cinnamoyloxybutyrate, isobutyl 2-tert-butyl-3-cinnamoyloxybutyrate, isobutyl 2-benzyl-3-cinnamoyloxybutyrate, isobutyl 2,2-dimethyl-3-cinnamoyloxybutyrate, methyl 3-cinnamoyloxybutyrate, methyl 2-methyl-3-cinnamoyloxybutyrate, methyl 2-ethyl-3-cinnamoyloxybutyrate, methyl 2-n-propyl-3-cinnamoyloxybutyrate, methyl 2-allyl-3-cinnamoyloxybutyrate, methyl 2-isopropyl-3-cinnamoyloxybutyrate, methyl 2-n-butyl-3-cinnamoyloxybutyrate, methyl 2-iso-butyl-3-cinnamoyloxybutyrate, methyl 2-tert-butyl-3-cinnamoyloxybutyrate, methyl 2-benzyl-3-cinnamoyloxybutyrate, methyl 2,2-dimethyl-3-cinnamoyloxybutyrate, ethyl 3-acetoxybutyrate.

The dibasic ester compounds are known or can be synthesized by methods known per se. For example, esterification between corresponding hydroxy ester compounds of formula (III),

(III)

wherein R' and $R_1$ are as defined in formula (I), and acyl compounds comprising R' group, for example, acid or acyl halide gives corresponding dibasic ester compounds.

The compounds of formula (III) are known or can be synthesized by methods known per se. For example, the compounds of formula (III) can be synthesized by reducing corresponding keto-ester compounds, which in turn can be synthesized by many methods. For instance, β-keto-ester compounds can be synthesized by condensing carboxylic ester.

Besides the ED compound (a), the catalyst component according to the invention can further comprise various other internal ED compounds known in the art.

In an embodiment of the invention, the catalyst component can further comprise an electron donor compound (b) selected from the group consisting of aliphatic dicarboxylic esters and aromatic dicarboxylic esters, preferably dialkyl phthalates, for example, diethyl phthalate, diisobutyl phthalate, di-n-butyl phthalate, diisooctyl phthalate, di-n-octyl phthalate, and the like. In this embodiment, molar ratio of ED compound (a) to ED compound (b) is typically in a range of from 0.01 to 100, preferably from 0.05 to 1, and more preferably from 0.1 to 0.3.

In another embodiment of the invention, the catalyst component can further comprise an electron donor compound (c) selected from the group consisting of 1,3-diether compounds of formula (IV)

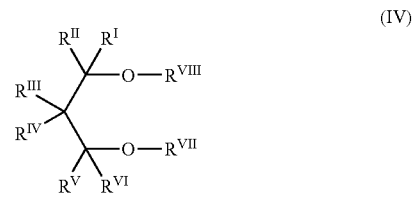
(IV)

wherein $R^I$, $R^{II}$, $R^{III}$, $R^{IV}$, $R^V$ and $R^{VI}$, which may be identical or different, can be selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl, and $R^{VII}$ and $R^{VIII}$, which may be identical or different, can be selected from the group consisting of linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl; and groups $R^I$ to $R^{VI}$ may link each other to form a ring.

The 1,3-diether compounds are preferably those having a formula (V):

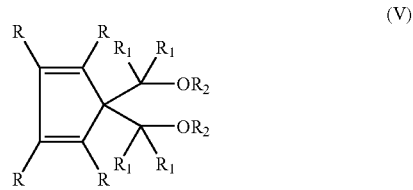
(V)

and more preferably, the 1,3-diether compounds are those having a formula (VI):

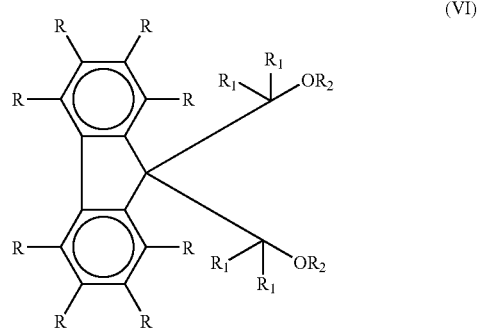
(VI)

In formulae (V) and (VI), R groups, which may be identical or different, can be selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl, $R_1$ groups, which may be identical or different, can be selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl;

$R_2$ groups, which may be identical or different, can be selected from the group consisting of linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl.

Examples of the 1,3-diether compounds include but are not limited to:

2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-di(p-chlorophenyl)-1,3-dimethoxypropane, 2,2-di(2-cyclohexylethyl)-1,3-dimethoxypropane, 2-methyl-2-iso-butyl-1,3-dimethoxypropane, 2-methyl-2-(2-ethylhexyl)-1,3-dimethoxypropane, 2,2-diiso-butyl-1,3-dimethoxypropane, 2,2-diphenyl-1,3-dimethoxypropane, 2,2-dibenzyl-1,3-dimethoxypropane, 2,2-di(cyclohexylmethyl)-1,3-dimethoxypropane, 2-iso-butyl-2-isopropyl-1,3-dimethoxypropane, 2-(1-methylbutyl)-2-isopropyl-1,3-dimethoxypropane, 2-(1-methylbutyl)-2-sec-butyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-benzyl-2-sec-butyl-1,3-dimethoxypropane, 2-phenyl-2-benzyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane, 1,1-di(methoxymethyl)-cyclopentadiene, 1,1-di(methoxymethyl)-2,3,4,5-tetramethylcyclopentadiene, 1,1-di(methoxymethyl)-2,3,4,5-tetraphenylcyclopentadiene, 1,1-di(methoxymethyl)-2,3,4,5-tetrafluorocyclopentadiene, 1,1-di(methoxymethyl)-3,4-dicyclopentylcyclopentadiene, 1,1-di(methoxymethyl)indene, 1,1-di(methoxymethyl)-2,3-dimethoxyindene, 1,1-di(methoxymethyl)-4,5,6,7-tetrafluoroindene, 1,1-di(methoxymethyl)-2,3,6,7-tetrafluoroindene, 1,1-di(methoxymethyl)-4,7-dimethylindene, 1,1-di(methoxymethyl)-3,6-dimethylindene, 1,1-di(methoxymethyl)-4-phenylindene, 1,1-di(methoxymethyl)-4-phenyl-2-methylindene, 1,1-di(methoxymethyl)-4-cyclohexylindene, 1,1-di(methoxymethyl)-7-(3,3,3-trifluoropropyl)indene, 1,1-di(methoxymethyl)-7-trimethylsilylindene, 1,1-di(methoxymethyl)-7-trifluoromethylindene, 1,1-di(methoxymethyl)-4,7-dimethyl-4,5,6,7-tetrahydroindene, 1,1-di(methoxymethyl)-7-methylindene, 1,1-di(methoxymethyl)-7-cyclopentylindene, 1,1-di(methoxymethyl)-7-isopropylindene, 1,1-di(methoxymethyl)-7-cyclohexylindene, 1,1-di(methoxymethyl)-7-tert-butylindene, 1,1-di(methoxymethyl)-7-tert-butyl-2-methylindene, 1,1-di(methoxymethyl)-7-phenylindene, 1,1-di(methoxymethyl)-2-phenylindene, 9,9-di(methoxymethyl)fluorene, 9,9-di(methoxymethyl)-2,3,6,7-tetramethylfluorene, 9,9-di(methoxymethyl)-2,3,4,5,6,7-hexafluorofluorene, 9,9-di(methoxymethyl)-benzo[2,3]indene, 9,9-di(methoxymethyl)-dibenzo[2,3,6,7]indene, 9,9-di(methoxymethyl)-2,7-dicyclopentylfluorene, 9,9-di(methoxymethyl)-1,8-dichlorofluorene, 9,9-di(methoxymethyl)-2,7-dicyclopentylfluorene, 9,9-di(methoxymethyl)-1,8-difluorofluorene, 9,9-di(methoxymethyl)-1,2,3,4-tetrahydrofluorene, 9,9-di(methoxymethyl)-1,2,3,4,5,6,7,8-octahydrofluorene, 9,9-di(methoxymethyl)-4-tert-butylfluorene, 1,1-di(1'-butoxyethyl)-cyclopentadiene, 1,1-di(1'-isopropoxy-n-propyl)cyclopentadiene, 1-methoxymethyl-1-(1'-methoxyethyl)-2,3,4,5-tetramethylcyclopentadiene, 1,1-di($\alpha$-methoxybenzyl)indene, 1,1-di(phenoxymethyl)-indene, 1,1-di(1'-methoxyethyl)-5,6-dichloroindene, 1,1-di(phenoxymethyl)-3,6-dicyclohexylindene, 1-methoxymethyl-1-(1'-methoxyethyl)-7-tert-butylindene, 1,1-bis[2-(2'-methoxypropyl)]-2-methylindene, 9,9-di($\alpha$-methoxyphenyl)fluorene, 9,9-di(1'-isopropoxy-n-butyl)-4,5-diphenylfluorene, 9,9-di(1'-methoxyethyl)fluorene, 9-(methoxymethyl)-9-(1'-methoxyethyl)-2,3,6,7-tetrafluorofluorene, 9-(methoxymethyl)-9-pentoxymethylfluorene, 9-(methoxymethyl)-9-ethoxymethylfluorene, 9-(methoxymethyl)-9-(1'-methoxyethyl)fluorene, 9-(methoxymethyl)-9-[2-(2'-methoxypropyl)]fluorene, 1,1-bis(methoxymethyl)-2,5-cyclohexadiene, 1,1-bis(methoxymethyl)benzonaphthalene, 7,7-bis(methoxymethyl)-2,5-norborandiene, 9,9-bis(methoxymethyl)-1,4-methanedihydronaphthalene, 9,9-bis(methoxymethyl)-9,10-dihydroanthracene, 1,1bis(methoxymethyl)-1,2-dihydcaracene, 4,4-bis(methoxymethyl)-1-phenyl-1,4-dihydrpanthracene, 4,4-bis(methoxymethyl)-1-phenyl-3,4-dihydronaphthalene, 5,5-bis(methoxymethyl)-1,3,6-cycloheptantriene.

These 1,3-diether compounds are disclosed in Chinese Patent CN1020448C and CN1141285A, the relevant contents of which are incorporated herein by reference.

In this embodiment, molar ratio of ED compound (a) to ED compound (c) is typically in a range of from 0.01 to 100, preferably from 0.05 to 1, and more preferably from 0.1 to 0.4.

In an embodiment, the solid catalyst components for olefin polymerization according to the present invention comprise a reaction product of a magnesium compound, a titanium compound, and ED compound (a) selected from the dibasic ester compounds of the formula (I) as defined above.

In another embodiment, the solid catalyst components for olefin polymerization according to the present invention comprise a reaction product of a magnesium compound, a titanium compound, and at least two kinds of ED compound, (a) and (b).

In still another embodiment, the solid catalyst components for olefin polymerization according to the present invention comprise a reaction product of a magnesium compound, a titanium compound, and at least two kinds of ED compound, (a) and (c).

Said magnesium compound is selected from the group consisting of magnesium dihalides, magnesium alkoxides, magnesium alkyls, water or alcohol complexes of magnesium dihalides, and derivatives of magnesium dihalides wherein one or two halogen atoms are replaced with alkoxy or halogenated alkoxy, and mixture thereof, preferably magnesium dihalides and alcohol complexes of magnesium dihalides, such as magnesium dichloride, magnesium dibromide, magnesium diiodide, and alcohol complexes thereof. Of the magnesium dihalides, the preferred is $MgCl_2$ in active state, which, as a component of Ziegler-Natta catalyst, is well known in the literatures.

Said titanium compound is represented by a formula of $TiX_n(OR)_{4-n}$, in which R(s) is/are independently hydrocarbyl having from 1 to 20 carbon atoms, preferably alkyl having from 1 to 20 carbon atoms such as n-butyl, iso-butyl, 2-ethylhexyl, n-octyl, and phenyl; X(s) is/are independently halogen; and n is an integer of from 1 to 4. Examples include titanium tetrachloride, titanium tetrabromide, titanium tetraiodide, tetrabutoxy titanium, tetraethoxy titanium, triethoxy titanium chloride, diethoxy titanium dichloride, ethoxy titanium trichloride and mixtures thereof, with titanium tetrachloride being preferred.

The catalyst component according to the invention can be prepared by various processes.

For instance, the solid catalyst component according to the invention can be prepared by a process described below.

Firstly, a magnesium compound is dissolved in a solvent system consisting of an organic epoxy compound, an organophosphorus compound and optionally an inert diluent to form a uniform solution, then the solution is mixed with a titanium compound, and a solid is precipitated in the presence of precipitation aid. The obtained solid is treated with said ED compound (a) and optional ED compound (b) and/or (c) to deposit said ED compound(s) on the solid and, if necessary, the solid can be treated again with titanium tetrahalide and inert diluent. Said precipitation aid is one of organic acid anhydrides, organic acids, ethers, and ketones, or mixture thereof. Examples of precipitation aid include acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, dipentyl ether.

The organic epoxy compound is at least one selected from the group consisting of aliphatic, epoxy compounds and diepoxy compounds, halogenated aliphatic epoxy compounds and diepoxy compounds, glycidyl ether, and inner ethers, having from 2 to 8 carbon atoms. Examples include, but are not limited to, epoxy ethane, epoxy propane, epoxy butane, vinyl epoxy ethane, butadiene dioxide, epoxy chloropropane, glycidyl methyl ether, diglycidyl ether and THF.

The organo phosphorus compound is at least one of hydrocarbyl esters or halogenated hydrocarbyl esters of orthophosphoric acid or phosphorous acid. The examples include trimethyl orthophosphate, triethyl orthophosphate, tributyl orthophosphate, triphenyl orthophosphate, trimethyl phosphite, triethyl phosphite, tributyl phosphite and tribenzyl phosphite.

The organic epoxy compound, the organo phosphorus compound, and the precipitation aid are disclosed in CN85100997, of which the relevant contents are incorporated herein by reference.

The individual raw materials can be used in an amount of from 0.2 to 10 moles for the organic epoxy compound; from 0.1 to 3 moles for the organophosphorus compound; from 0 to 1.0 moles, preferably from 0.03 to 0.6 mol for the precipitation aid; from 0.5 to 150 moles for the titanium compound; and 0.02 to 0.4 moles for the dibasic ester compound of the formula (I) (ED compound (a)), based on per mole magnesium halide. In the case where ED compound (b) is used, it is used in an amount of from 0.02 to 0.4 moles, and ratio of ED compound (a) to ED compound (b) is as described above. In the case where ED compound (c) is used, it is used in an amount of from 0.02 to 0.4 moles, and ratio of ED compound (a) to ED compound (c) is as described above.

For more sufficiently dissolving magnesium halide, an inert diluent is optionally added in the solvent system. The inert diluent can typically be aromatic hydrocarbons or alkanes, as long as it can facilitate the dissolution of magnesium halide. Examples of aromatic hydrocarbons include benzene, toluene, xylene, chlorobenzene, dichlorobenzene, trichlorobenzene, chlorotoluene, and derivatives thereof, and examples of alkanes include linear, branched, or cyclic alkanes having from 3 to 20 carbon atoms, such as butane, pentane, hexane, cyclohexane, heptane, and the like. These inert diluents may be used alone or in combination. The amount of the inert diluent, if used, is not critical, however, it can be in a range of from 0.2 to 10 liters per mole of magnesium halide.

According to another process, a titanium compound of formula $TiX_n(OR)_{4-n}$, wherein R is independently hydrocarbon radical having 1 to 20 carbon atoms, X is independently halogen, and n is a value between 1 and 4, preferably $TiCl_4$, is reacted with an addition compound of formula $MgCl_2pROH$, in which p is between 0.1 and 6, preferably between 2 and 3.5, R is a hydrocarbon radical having 1 to 18 carbon atoms, to prepare the solid catalyst component. The addition compound can be advantageously prepared into sphere according to the following process: an alcohol is mixed with magnesium dichloride in the presence of an inert hydrocarbon which is immiscible with the addition compound, and the emulsion is quenched quickly to solidify the addition compound in the form of sphere particle. Such obtained addition compound can be directly reacted with the titanium compound, or before it is reacted with the titanium compound, it can be subjected to a heat control dealcoholization at a temperature of from 80 to 130° C. to obtain an addition compound, in which the molar number of alcohol is generally lower than 3, preferably from 0.1 to 2.7. The addition compound (dealcoholized or as-such) can be suspended in cool $TiCl_4$ (generally 0° C.), and reacted with titanium compound by programmed heating to a temperature of from 80 to 130° C. and holding at said temperature for 0.1 to 2 hours. The treatment with $TiCl_4$ can be carried out for one or more times. During the treatment with $TiCl_4$, ED compound (a) and optional ED compound (b) and/or (c) can be added, and this treatment can also be repeated one or more times. Reference is made to CN1036011C and CN1330086A, of which the relevant contents are incorporated herein by reference, for detailed description on the preparation procedure.

Another process for preparing the solid catalyst component of the invention comprises: dissolving a magnesium compound in an ED compound, such as alcohols, ethers and the like, to form a uniform solution, mixing the solution with a titanium compound and allowing them to react to re-precipitate. This process was disclosed in CN1057656. In addition, reference can be made to U.S. Pat. No. 4,866,022 and U.S. Pat. No. 4,829,037 for the process of preparing the solid catalyst component of the invention. In these processes, ED compound (a) and optional ED compound (b) and/or (c) according to the invention can be added to the reaction system before, during or after contacting magnesium compound and titanium compound.

The ED compound (a) and optional ED compound (b) and/or (c) can be together used in many manners. It is preferred to use them as a mixture during the preparation of the catalyst component. Alternatively, compound (a) can be added at first, then ED compound (b) and/or (c) is/are added, vice versa. Generally, the solid catalyst component of the invention comprises from 0.5 to 10 percent by weight of titanium, from 1 to 30 percent by weight of magnesium, from 2 to 65 percent by weight of halogen, and from 2 to 40 percent by weight of ED compound(s), based on the total weight of the solid catalyst component.

Another object of the invention is to provide a catalyst for polymerization of olefin $CH_2=CHR$, wherein R is hydrogen or $C_1$-$C_{12}$ alkyl or aryl group, comprising the reaction product of the following components:

(a) solid catalyst component as described above, comprising magnesium, titanium, halogen, and a dibasic ester compound of the formula (I), and optional ED compound (b) and/or (c);

(b) alkyl aluminum compound; and (c) optionally, external electron donor compound.

The alkyl aluminum compound is represented by a formula of $AlR_nX_{3-n}$, wherein R(s) is/are independently hydrogen or hydrocarbyl having from 1 to 20 carbon atoms, X(s) is/are independently halogen, and n is a value meeting the condition of $1 < n \leq 3$. Examples of alkyl aluminum compound include trialkyl aluminum such as trimethyl aluminum, triethyl aluminum, tripropyl aluminum, tributyl aluminum, triisobutyl aluminum, trioctyl aluminum, triisooctyl aluminum; diethyl aluminum hydride, diisobutyl aluminum hydride; alkyl aluminum halides such as diethyl aluminum chloride, diisobutyl aluminum chloride, sesquiethyl aluminum chloride, and ethyl aluminum dichloride. The preferred is triethyl aluminum and triisobutyl aluminum For olefin polymerization application needing very high isotactic index of polymer, there needs the use of external donor compound component (3), for example, organosilicon compound of formula $R_nSi(OR')_{4-n}$, in which $0 \leq n \leq 3$, R and R', which may be identical or different, are alkyl, cycloalkyl, aryl, or haloalkyl, and R can also be halogen or hydrogen. Examples include trimethylmethoxysilane, trimethylethoxysilane, dimethyldimethoxysilane, dimethyldiethoxysilane, diphenyldimethoxysilane, diphenyldiethoxysilane, phenyltriethoxysilane, phenyltrimethoxysilane, vinyltrimethoxysilane, cyclohexylmethyldimethoxysilane, methyltert-butyldimethoxysilane, with cyclohexylmethyldimethoxysilane and diphenyldimethoxysilane being preferred.

The ratio of component (1) to component (2) to component (3) is in a range of 1:5-5000:0-500, preferably 1:20-500:25-100, on molar basis and based on titanium: aluminum:silicon; furthermore, molar ratio of the alkyl aluminum to the external ED compound is in a range of 0.1-500, preferably 1-300, and more preferably 3-100.

The external ED component can also be selected from the group consisting of monocarboxylic esters or polycarboxylic esters such as benzene monocarboxylic esters or benzene polycarboxylic esters, preferably benzene monocarboxylic esters (benzoates).

The external ED component can also be selected from the group consisting of 1,3-diethers of formula (VII)

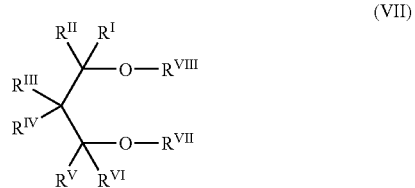

wherein $R^I$, $R^{II}$, $R^{III}$, $R^{IV}$, $R^V$ and $R^{VI}$, which may be identical or different, can be hydrogen or hydrocarbon radical having from 1 to 18 carbon atoms, and $R^{VII}$ and $R^{VIII}$, which may be identical or different, can be hydrocarbon radical having from 1 to 18 carbon atoms; and one or more of groups $R^I$ to $R^{VI}$ may form a ring. Preferably, $R^{VII}$ and $R^{VIII}$ are $C_1$-$C_4$ alkyl, $R^{III}$ and $R^{IV}$ together form an unsaturated condensed ring system, and $R^I$, $R^{II}$, $R^V$, and $R^{VI}$ are hydrogen. One example is 9,9-bis(methoxymethyl)fluorene.

These external ED compounds as well as their use in olefin polymerization are well known by those skilled in the art.

Another aspect of the invention relates to a process for the polymerization of olefin using the catalyst according to the invention, said process comprising contacting olefin $CH_2=CHR$, in which R is hydrogen or $C_1$-$C_{12}$ alkyl or aryl group, and optional comonomer with the catalyst or the prepolymerized catalyst according to the invention under polymerization conditions.

The polymerization of olefin(s) is carried out in liquid phase or in gas phase or in a combination of gas phase and liquid phase, according to well-known processes. For instance, conventional techniques, such as slurry polymerization techniques or gas phase fluidized bed polymerization techniques could be used, and the olefins can be selected from the group consisting of ethylene, propylene, 1-butene, 4-methyl-1-pentene, and 1-hexene. In particular, the olefin polymerization can be homopolymerization of propylene or copolymerization of propylene and other olefin(s). The polymerization is preferably carried out at a temperature of from 0° C. to 150° C., preferably from 60° C. to 90° C.

The catalysts of the invention can be directly added to the reactors for polymerization. Alternatively, the catalysts may be prepolymerized before being added to a first polymerization reactor. The term "prepolymerized catalyst" as used herein intends to mean the catalyst that has been subjected to a polymerization at lower conversion extent. According to the invention, said prepolymerized catalysts comprise the prepolymers obtained by prepolymering an olefin in the presence of the solid catalyst components, with the prepolymerization times being in a range of from 0.1 to 1000 grams olefin polymer per gram solid catalyst component.

It is possible to use an α-olefin as defined above in the prepolymerization, with ethylene or propylene being preferred. Specifically, it is especially preferred to use ethylene or a mixture of ethylene with one or more α-olefins in an amount up to 20 mol % in the prepolymerization reaction. Preferably, the conversion extent of the solid catalyst components prepolymerized is in a range of from about 0.2 to about 500 grams polymer per gram solid catalyst component.

The prepolymerization process can be performed at a temperature of from −20 to 80° C., preferably from 0 to 50° C., in liquid phase or gas phase. The pressure of the prepolymerization process can be in a range of from 0.01 to 10 MPa, and the prepolymerization time depends on prepolymerization temperature and pressure used and conversion extent required. The prepolymerization step can be carried out on-line as a part of a continuous polymerization process, or carried out separately in a batch operation. For preparing polymer in an amount of 0.5-20 g/g catalyst component, batch prepolumerization of ethylene in the presence of the catalysts according to the invention is preferred.

The catalysts according to the invention are also useful in the production of polyethylene and copolymer of ethylene and other α-olefins, such as propylene, butene, pentene, hexene, octene, and 4-methyl-1-pentene.

According to the invention, catalysts exhibiting excellent general performance can be obtained by using the novel dibasic ester ED compounds (internal ED compound (a)), and optionally further using the internal ED compound (b) and/or (c) in combination. When used in propylene polymerization, the catalysts exhibit satisfied polymerization activity, and the resulting polymers have higher stereoselectivity and broader molecular weight distribution. These properties are desired in the development of different grades of polymers.

EMBODIMENTS OF THE INVENTION

The following examples further describe the invention, but do not make limitation to the invention in any way.

Testing methods:
1. Melting point: XT4A microscopic melting point measuring instrument (temperature controlled type).
2. Measurement of nuclear magnetic resonance: using Bruke dmx300 nuclear magnetic resonance spectrometer for $^1$H-NMR (300 MHz, solvent is $CDCl_3$, TMS is used as internal standard, and measuring temperature is 300K).
3. Molecular weight and molecular weight distribution (MWD) (MWD=Mw/Mn) of polymer: measured by gel permeation chromatography using PL-GPC 220 with trichlorobenzene as solvent at 150° C. (standard sample: polystyrene, flow rate: 1.0 ml/min, columns: 3×Pl gel 10 um M1×ED-B 300×7.5 nm).
4. Isotacticity of polymer: measured by heptane extraction method (heptane boiling extraction for 6 hours) as the following procedure: 2 g dried polymer sample is extracted with boiling heptane in an extractor for 6 hours, then the residual substance is dried to constant weight, and the ratio of the weight of residual polymer (g) to 2 is regarded as isotacticity.
5. IR spectrum: recorded by conventional method in MAGNA-IR 760 model IR spectrograph available from NICOLET Corp.
6. Melt index: measured according to ASTM D1238-99.

PREPARATION EXAMPLE

Synthesis of Dibasic Ester Compounds

Preparation Example 1

Preparation of ethyl 2-benzyl-3-benzoyloxybutyrate (1) Preparation of ethyl 2-benzyl-3-oxo-butyrate 0.1 Mol of ethyl acetoacetate, 0.1 mol of $K_2CO_3$, 0.1 mol of benzyl bromide, 0.01 mmol of PEG-400 (polyethylene glycol 400) and 100 ml of benzene were stirred at 75° C. for 7 hours. After cooling, 20 ml of saturated solution of $NH_4Cl$ was added to dissolve solid, and product was extracted with ethyl acetate. After removing the solvent, the residue was distilled under reduced pressure, and a cut fraction was collected at 116-118° C./20 Pa. Yield 74%.

(2) Preparation of ethyl 2-benzyl-3-hydroxybutyrate 0.05 Mol of $NaBH_4$ and 0.4 g of NaOH were added into 25 ml of water. While cooling the reactor in ice bath, a mixture of 0.07 mol of ethyl 2-benzyl-3-oxo-butyrate and 30 ml of methanol was added dropwise with stirring, and the reaction was stirred at room temperature for 5 hours. After removing the solvent, the product was extracted with ethyl acetate, and the extract was dried over anhydrous $Na_2SO_4$. Removing the solvent gave a colorless liquid of 0.06 mol. Yield 85%.

(3) Preparation of ethyl 2-benzyl-3-benzoyloxybutyrate

A mixture of 0.04 mol of ethyl 2-benzyl-3-hydroxybutyrate, 0.045 mol of pyridine, 0.05 mol of benzoyl chloride and 40 ml of dried tetrahydrofuran (THF) was refluxed by heating for 8 hrs, and then was allowed to react at room temperature for further 12 hrs. Upon the completion of the reaction, the reaction mixture was filtered, and the solid component was wished with diethyl ether for three times. The organic phases were combined, wished well with saturated saline, and then dried over anhydrous sodium sulfate. After removing the solvent, residue was subjected to column chromatography to give a colorless liquid. Yield 85%.

$^1$H-NMR(300 MHz, $CDCl_3$, TMS as internal standard): δ 1.0-1.1(3H, $CH_3$), 1.41-1.45(3H, $CH_3$), 2.9-3.0(2H, CH), 3.0-3.1(1H, CH), 4.01-4.05(2H, $CH_2$), 5.3-5.4(1H, CH), 7.1-8.0(10H, ArH)

Preparation Example 2

Preparation of ethyl 3-benzoyloxybutyrate

1) Preparation of ethyl 3-hydroxybutyrate

To a three-necked flask equipped with a dropping funnel were successively added 1.5 g of sodium borohydride, 0.02 g of sodium hydroxide, and 13 ml of water, and the mixture was stirred to homogenity. While cooling in an ice bath and stirring, to the flask was added slowly a mixture of 0.1 mol of ethyl acetoacetate and 15 ml of anhydrous methanol. Upon the completion of the addition, the reaction was continued for 2 hrs. The reaction mixture was evaporated using a rotatory evaporator to remove methanol and most of water until the residue was in solid phase. The solid phase was extracted with anhydrous diethyl ether with stirring for 24 hrs. The extract was filtered and dried over anhydrous sodium sulfate. Evaporating solvent gave 0.052 mol of the product, ethyl 3-hydroxybutyrate. Yield 52%.

2) Preparation of ethyl 3-benzoyloxybutyrate

Under nitrogen atmosphere free of water and oxygen, to a reactor were successively added 50 ml of THF, 0.04 mol of ethyl 3-hydroxybutyrate, and 0.06 mol of pyridine, then 0.05 mol of benzoyl chloride was slowly dropped thereto. Upon the completion of the dropping, the reaction was heated to reflux for 8 hrs, and then was continued at room temperature for 12 hrs. Upon the completion of the reaction, the reaction mixture was filtered, and the solid component was wished with anhydrous diethyl ether for three times. The combined organic phase was wished well with saturated saline, then dried over anhydrous sodium sulfate. The solvent was evaporated in a rotatory evaporator and the residue was subjected to column chromatography, to give 0.32 mol of product, ethyl 3-benzoyloxybutyrate. Yield 80%.

$^1$H-NMR(300 MHz, $CDCl_3$): δ 7.4-8.0(5H, ArH), 5.3(1H, CH), 4.1(2H, $CH_2$), 2.6(2H, $CH_2$), 1.3(3H, $CH_3$), 1.2(3H, $CH_3$)

Preparation Example 3

Preparation of ethyl 2-methyl-3-benzoyloxybutyrate

1) Preparation of ethyl 2-methyl-3-oxo-butyrate

Under nitrogen atmosphere free of water and oxygen, to a three-necked flask equipped with a dropping funnel were successively added 0.15 mol of potassium tert-butoxide and 150 ml of THF, then stirrer was started. 0.12 Mol of ethyl acetoacetate was slowly dropped to the reactor cooled in an ice-water bath. Upon completion of the dropping, the reaction was continued at room temperature for further 1 hr. Then 0.18 mol of methyl iodide was slowly dropped at room temperature, and then the reaction was continued at room temperature for further 24 hrs. At the end of the reaction, solvent was evaporated by using a rotatory evaporator, and saturated saline was added to just dissolve the solid. Organic phase was separated, and aqueous phase was extracted with a suitable amount of diethyl ether for three times. The combined organic phase was washed well with saturated saline, then dried over anhydrous sodium sulfate. Solvent was removed by using a rotatory evaporator, and the residue was distilled under reduced pressure to give 0.084 mol of product. Yield 70%.

2) Preparation of ethyl 2-methyl-3-hydroxybutyrate

Ethyl 2-methyl-3-hydroxybutyrate was prepared following the procedure as described in step 1) of Preparation Example 2, except for that ethyl 2-methyl-3-oxo-butyrate was used to replace for ethyl acetoacetate. Yield 60%.

3) Preparation of ethyl 2-methyl-3-benzoyloxybutyrate

Ethyl 2-methyl-3-benzoyloxybutyrate was prepared following the procedure as described in step 2) of Preparation Example 2, except for that ethyl 2-methyl-3-hydroxybutyrate was used to replace for ethyl 3-hydroxybutyrate. Yield 75%.

$^1$H-NMR(300 MHz, CDCl$_3$): δ 7.4-8.0(5H, ArH), 5.3(1H, CH), 4.1(2H, CH$_2$), 2.6(1H, CH), 1.2(3H, CH$_3$), 1.0(6H, CH$_3$)

Preparation Example 4

Preparation of ethyl 2-ethyl-3-benzoyloxybutyrate

1) Preparation of ethyl 2-ethyl-3-oxo-butyrate

The target product was prepared following the procedure as described in step 1) of Preparation Example 3, except for that ethyl iodide was used to replace for methyl iodide. Yield 65%.

2) Preparation of ethyl 2-ethyl-3-hydroxybutyrate

Ethyl 2-ethyl-3-hydroxybutyrate was prepared following the procedure as described in step 1) of Preparation Example 2, except for that ethyl 2-ethyl-3-oxo-butyrate was used to replace for ethyl acetoacetate. Yield 60%.

3) Preparation of ethyl 2-ethyl-3-benzoyloxybutyrate

Ethyl 2-ethyl-3-benzoyloxybutyrate was prepared following the procedure as described in step 2) of Preparation Example 2, except for that ethyl 2-ethyl-3-hydroxybutyrate was used to replace for ethyl 3-hydroxybutyrate. Yield 75%.

$^1$H-NMR(300 MHz, CDCl$_3$): δ 7.4-8.0(5H, ArH), 5.3(1H, CH), 4.1(2H, CH$_2$), 2.6(1H, CH), 1.7(2H, CH$_2$), 1.3(3H, CH$_3$), 1.2(3H, CH$_3$), 0.94(3H, CH$_3$)

Preparation Example 5: Preparation of ethyl 2-allyl-3-benzoyloxybutyrate

1) Preparation of ethyl 2-allyl-3-oxo-butyrate

The target product was prepared following the procedure as described in step 1) of Preparation Example 3, except for that allyl bromide was used to replace for methyl iodide. Yield 71%.

2) Preparation of ethyl 2-allyl-3-hydroxybutyrate

Ethyl 2-allyl-3-hydroxybutyrate was prepared following the procedure as described in step 1) of Preparation Example 2, except for that ethyl 2-allyl-3-oxo-butyrate was used to replace for ethyl acetoacetate. Yield 60%.

3) Preparation of ethyl 2-allyl-3-benzoyloxybutyrate

Ethyl 2-allyl-3-benzoyloxybutyrate was prepared following the procedure as described in step 2) of Preparation Example 2, except for that ethyl 2-allyl-3-hydroxybutyrate was used to replace for ethyl 3-hydroxybutyrate. Yield 75%.

$^1$H-NMR(300 MHz, CDCl$_3$): δ 7.4-8.0(5H, ArH), 5.0(2H, =CH$_2$), 5.8(1H, CH), 5.3(1H, CH), 4.1(2H, CH$_2$), 2.49(2H, CH$_2$), 1.2(3H, CH$_3$), 1.1(3H, CH$_3$)

Preparation Example 6

Preparation of ethyl 3-benzoyloxyvalerate

1) Preparation of ethyl 3-hydroxyvalerate

Ethyl 3-hydroxyvalerate was prepared following the procedure as described in step 1) of Preparation Example 2, except for that ethyl propionylacetate was used to replace for ethyl acetoacetate. Yield 50%.

2) Preparation of ethyl 3-benzoyloxyvalerate

Ethyl 3-benzoyloxyvalerate was prepared following the procedure as described in step 2) of Preparation Example 2, except for that ethyl 3-hydroxyvalerate was used to replace for ethyl 3-hydroxybutyrate. Yield 72.5%.

$^1$H-NMR(300 MHz, CDCl$_3$): δ 7.4-8.1(5H, ArH), 5.3(1H, CH), 4.3(2H, CH$_2$), 3.6(2H, CH$_2$), 2.6(2H, CH$_2$), 1.7(3H, CH$_3$), 1.0(3H, CH$_3$)

Preparation Example 7

Preparation of ethyl 3-benzoyloxycaproate

1) Preparation of ethyl 3-hydroxycaproate

Ethyl 3-hydroxycaproate was prepared following the procedure as described in step 1) of Preparation Example 2, except for that ethyl butyrylacetate was used to replace for ethyl acetoacetate. Yield 48%.

2) Preparation of ethyl 3-benzoyloxycaproate Ethyl 3-benzoyloxycaproate was prepared following the procedure as described in step 2) of Preparation Example 2, except for that ethyl 3-hydroxycaproate was used to replace for ethyl 3-hydroxybutyrate. Yield 81.5%.

$^1$H-NMR(300 MHz, CDCl$_3$): δ 7.4-8.0(5H, ArH), 5.4(1H, CH), 4.1(2H, CH$_2$), 3.6(2H, CH$_2$), 2.6(2H, CH$_2$), 1.4(3H, CH$_3$), 1.1(3H, CH$_3$), 0.9(3H, CH$_3$)

Preparation Example 8

Preparation of ethyl 2-methyl-3-benzoyloxyvalerate

1) Preparation of ethyl 2-methyl-3-oxo-valerate

The target product was prepared following the procedure as described in step 1) of Preparation Example 3, except for that ethyl propionylacetate was used to replace for ethyl acetoacetate. Yield 45%.

2) Preparation of ethyl 2-methyl-3-hydroxyvalerate Ethyl 2-methyl-3-hydroxyvalerate was prepared following the procedure as described in step 1) of Preparation Example 2, except for that ethyl 2-methyl-3-oxo-valerate was used to replace for ethyl acetoacetate. Yield 60%.

3) Preparation of ethyl 2-methyl-3-benzoyloxyvalerate

Ethyl 2-methyl-3-benzoyloxyvalerate was prepared following the procedure as described in step 2) of Preparation Example 2, except for that ethyl 2-methyl-3-hydroxyvalerate was used to replace for ethyl 3-hydroxybutyrate. Yield 75%.

$^1$H-NMR(300 MHz, CDCl$_3$): δ 7.4-8.1(5H, ArH), 5.3(1H, CH), 4.0(2H, CH$_2$), 2.5(1H, CH), 1.7(3H, CH$_3$), 1.5(2H, CH$_2$), 1.1(3H, CH$_3$), 0.9(3H, CH$_3$)

Preparation Example 9

Preparation of ethyl 3-acetoxybutyrate

Ethyl 3-acetoxybutyrate was prepared following the procedure as described in step 2) of Preparation Example 2, except for that acetyl chloride was used to replace for benzoyl chloride. Yield 75%.

$^1$H-NMR(300 MHz, CDCl$_3$): δ 5.3(1H, CH), 4.1(2H, CH$_2$), 2.6(2H, CH$_2$), 1.4(3H, CH$_3$), 1.3(3H, CH$_3$), 1.1(3H, CH$_3$)

Preparation Example 10

Preparation of isobutyl 3-benzoyloxybutyrate

1) Preparation of isobutyl 3-hydroxybutyrate

Isobutyl 3-hydroxybutyrate was prepared following the procedure as described in step 1) of Preparation Example 2, except for that isobutyl acetoacetate was used to replace for ethyl acetoacetate. Yield 52%.

2) Preparation of isobutyl 3-benzoyloxybutyrate

Isobutyl 3-benzoyloxybutyrate was prepared following the procedure as described in step 2) of Preparation Example 2, except for that isobutyl 3-hydroxybutyrate was used to replace for ethyl 3-hydroxybutyrate. Yield 75%.

$^1$H-NMR(300 MHz, CDCl$_3$): δ 7.4-8.0(5H, ArH), 5.3(1H, CH), 4.3(2H, CH$_2$), 2.6(2H, CH$_2$), 1.5(1H, CH), 1.3(3H, CH$_3$), 1.2(6H, CH$_3$)

Preparation Example 11

Preparation of benzyl 3-benzoyloxybutyrate

1) Preparation of benzyl 3-hydroxybutyrate

Benzyl 3-hydroxybutyrate was prepared following the procedure as described in step 1) of Preparation Example 2, except for that benzyl acetoacetate was used to replace for ethyl acetoacetate. Yield 48%.

2) Preparation of benzyl 3-benzoyloxybutyrate Benzyl 3-benzoyloxybutyrate was prepared following the procedure as described in step 2) of Preparation Example 2, except for that benzyl 3-hydroxybutyrate was used to replace for ethyl 3-hydroxybutyrate. Yield 75%.

$^1$H-NMR(300 MHz, CDCl$_3$): δ 7.4-8.0(10H, ArH), 5.3 (1H, CH), 4.8(2H, CH$_2$), 2.6(2H, CH$_2$), 1.3(3H, CH$_3$)

Preparation Example 12

Preparation of methyl 3-benzoyloxybutyrate

1) Preparation of methyl 3-hydroxybutyrate

Methyl 3-hydroxybutyrate was prepared following the procedure as described in step 1) of Preparation Example 2, except for that methyl acetoacetate was used to replace for ethyl acetoacetate. Yield 52%.

2) Preparation of methyl 3-benzoyloxybutyrate

Methyl 3-benzoyloxybutyrate was prepared following the procedure as described in step 2) of Preparation Example 2, except for that methyl 3-hydroxybutyrate was used to replace for ethyl 3-hydroxybutyrate. Yield 80%.

$^1$H-NMR(300 MHz, CDCl$_3$): δ 7.4-8.0(5H, ArH), 5.2(1H, CH), 3.6(3H, CH$_3$), 2.6-2.8(2H, CH$_2$), 1.4(3H, CH$_3$)

Preparation Example 13

Preparation of methyl 2-methyl-3-benzoyloxybutyrate

The target product, methyl 2-methyl-3-benzoyloxybutyrate, was prepared following the procedure as described in Preparation Example 3, except for that methyl acetoacetate was used to replace for ethyl acetoacetate as starting material. The three steps have yield of 70%, 60%, and 77%, respectively.

$^1$H-NMR(300 MHz, CDCl$_3$): δ 7.4-8.0(5H, ArH), 5.3(1H, CH), 3.6(3H, CH$_3$), 2.7-2.8(1H, CH), 1.3(3H, CH$_3$), 1.2(3H, CH$_3$)

Preparation Example 14

Preparation of tert-butyl 3-benzoyloxybutyrate

The target product, tert-butyl 3-benzoyloxybutyrate, was prepared following the procedure as described in Preparation Example 2, except for that tert-butyl acetoacetate was used to replace for ethyl acetoacetate as starting material. The two steps have yield of 55% and 82%, respectively.

$^1$H-NMR(300 MHz, CDCl$_3$): δ 7.4-8.0(5H, ArH), 5.4(1H, CH), 2.5-2.7(2H, CH$_2$), 1.4(3H, CH$_3$), 1.37(9H, CH$_3$)

Preparation Example 15

Preparation of methyl 2-ethyl-3-benzoyloxybutyrate

1) Preparation of methyl 2-ethyl-3-oxo-butyrate

Under nitrogen atmosphere free of water and oxygen, to a three-necked flask equipped with a dropping funnel were successively added 0.15 mol of potassium tert-butoxide and 150 ml of THF, then stirrer was started. 0.12 Mol of methyl acetoacetate was slowly dropped to the reactor cooled in an ice-water bath. Upon completion of the dropping, the reaction was continued at room temperature for further 1 hr. Then 0.18 mol of ethyl iodide was slowly dropped at room temperature, and then the reaction was heated to reflux for 6 hrs. At the end of the reaction, solvent was evaporated by using a rotatory evaporator, and saturated saline was added to just dissolve the solid. Organic phase was separated, and aqueous phase was extracted with a suitable amount of diethyl ether for three times. The combined organic phase was washed well with saturated saline, then dried over anhydrous sodium sulfate. Solvent was removed by using a rotatory evaporator, and the residue was distilled under reduced pressure to give 0.072 mol of product. Yield 60%.

2) Preparation of methyl 2-ethyl-3-hydroxybutyrate

Methyl 2-ethyl-3-hydroxybutyrate was prepared following the procedure as described in step 2) of Preparation Example 4, except for that methyl 2-ethyl-3-oxo-butyrate was used to replace for ethyl 2-ethyl-3-oxo-butyrate. Yield 50%.

3) Preparation of methyl 2-ethyl-3-benzoyloxybutyrate

Methyl 2-ethyl-3-benzoyloxybutyrate was prepared following the procedure as described in step 3) of Preparation Example 4, except for that methyl 2-ethyl-3-hydroxybutyrate was used to replace for ethyl 2-ethyl-3-hydroxybutyrate. Yield 77%.

$^1$H-NMR(300 MHz, CDCl$_3$): δ 7.4-8.0(5H, ArH), 5.3(1H, CH), 3.6(3H, CH$_3$), 2.7-2.8(1H, CH), 1.3(3H, CH$_3$), 1.2(2H, CH$_2$), 0.9(3H, CH$_3$)

Preparation Example 16

Preparation of methyl 3-benzoyloxyvalerate

The target product, methyl 3-benzoyloxyvalerate, was prepared following the procedure as described in Preparation Example 6, except for that methyl propionylacetate was used to replace for ethyl propionylacetate as starting material. The two steps have yield of 49% and 75%, respectively.

$^1$H-NMR(300 MHz, CDCl$_3$): δ 7.4-8.0(5H, ArH), 5.2(1H, CH), 3.6(3H, CH$_3$), 2.6-2.8(2H, CH$_2$), 1.4(2H, CH$_2$), 1.0 (3H, CH$_3$)

Preparation Example 17

Preparation of tert-butyl 2-methyl-3-benzoyloxybutyrate

The target product, tert-butyl 2-methyl-3-benzoyloxybutyrate, was prepared following the procedure as described in Preparation Example 3, except for that tert-butyl acetoacetate was used to replace for ethyl acetoacetate as starting material. The three steps have yield of 70%, 50%, and 85%, respectively.

$^1$H-NMR(300 MHz, CDCl$_3$): δ 7.4-8.0(5H, ArH), 5.36 (1H, CH), 2.6-2.7(1H, CH), 1.35(12H, CH$_3$), 1.2(3H, CH$_3$)

Preparation Example 18

Preparation of tert-butyl 2-ethyl-3-benzoyloxybutyrate

The target product, tert-butyl 2-ethyl-3-benzoyloxybutyrate, was prepared following the procedure as described in Preparation Example 4, except for that tert-butyl acetoacetate was used to replace for ethyl acetoacetate as starting material. The three steps have yield of 60%, 50%, and 80%, respectively.

$^1$H-NMR(300 MHz, CDCl$_3$): δ 7.4-8.0(5H, ArH), 5.2(1H, CH), 2.5(1H, CH), 1.6(2H, CH$_2$), 1.3(12H, CH$_3$), 0.9(3H, CH$_3$)

Preparation Example 19

Preparation of ethyl 3-benzoyloxy-4,4-dimethylvalerate

The target product, ethyl 3-benzoyloxy-4,4-dimethylvalerate, was prepared following the procedure as described in Preparation Example 6, except for that ethyl 4,4-dimethyl-3-oxo-valerate was used to replace for ethyl propionylacetate as starting material. The two steps have yield of 49% and 75%, respectively.

$^1$H-NMR(300 MHz, CDCl$_3$): δ 7.3-8.0(5H, ArH), 5.2(1H, CH), 4.3-4.4(2H, CH$_2$), 2.0(2H, CH$_2$), 1.2(3H, CH$_3$), 1.0 (9H, CH$_3$)

Preparation Example 20

Preparation of ethyl 2-methyl-3-fluorenoyloxybutyrate 0.01 Mole of ethyl 2-methyl-3-fluorenoyloxybutyrate was prepared from 0.04 mol of ethyl 2-methyl-3-hydroxybutyrate and 0.05 mol of fluorenoyl chloride (9-fluorenyl carbonyl chloride) following the procedure as described in step 3) of the Preparation Example 3. Yield 25%.

$^1$H-NMR(300 MHz, CDCl$_3$): δ 1.0(6H, CH$_3$), 1.2(3H, CH$_3$), 2.6(1H, CH), 4.1(2H, CH$_2$), 5.3(1H, CH), 6.8(1H, ArH), 7.4-7.9(10H, ArH)

Preparation Example 21

Preparation of isopropyl 3-benzoyloxybutyrate

The target product was prepared following the procedure as described in Preparation Example 2, except for that isopropyl acetoacetate was used to replace for ethyl acetoacetate as starting material. The two steps have yield of 55% and 81%, respectively.

$^1$H-NMR(300 MHz, CDCl$_3$): δ 1.1(3H, CH$_3$), 1.3(6H, CH$_3$), 2.6(2H, CH$_2$), 4.5(1H, CH), 5.3(1H, CH), 7.4-8.0(5H, ArH)

Preparation Example 22

Preparation of butyl 9-benzoyloxyfluorene-9-carboxylate

1) Preparation of butyl 9-hydroxyfluorene-9-carboxylate

To a reactor were added 0.05 mol of 9-hydroxyfluorene-9-carboxlic acid, 0.075 mol of butanol, 40 ml of toluene and 0.4 ml of concentrated sulfuric acid. The reaction was heated to reflux for 6 hrs, while water was separated by a water segregator. At the end of the reaction, the reaction mixture was neutralized with sodium bicarbonate, washed with saturated saline, extracted with ethyl acetate, and dried over anhydrous sodium sulfate. Removing the solvent gave the product with a yield of 80%.

2) Preparation of butyl 9-benzoyloxyfluorene-9-carboxylate Under nitrogen atmosphere, to a reactor were successively added 50 ml of THF, 0.04 mol of butyl 9-hydroxyfluorene-9-carboxylate, and 0.06 mol of pyridine, then 0.05 mol of benzoyl chloride was slowly dropped thereto. Upon the completion of the dropping, the reaction was heated to reflux for 8 hrs. Upon the completion of the reaction, the reaction mixture was filtered, and the solid component was extracted with ethyl acetate. The combined organic phase was wished well with saturated saline, then dried over anhydrous sodium sulfate. The solvent was evaporated, and the residue was subjected to column chromatography, to give the product, butyl 9-benzoyloxyfluorene-9-carboxylate, with a yield of 71%.

$^1$H-NMR(300 MHz, CDCl$_3$): δ 0.9(3H, CH$_3$), 1.2(4H, CH$_2$), 2.7(2H, CH$_2$), 3.6(2H, CH$_2$), 7.3-8.3(13H, ArH)

Preparation Example 23

Preparation of isobutyl 2-isobutyl-3-benzoyloxybutyrate

The target product was prepared following the procedure as described in Preparation Example 3, except for that isobutyl acetoacetate and isobutyl iodide were used to replace for ethyl acetoacetate and methyl iodide, respectively. The three steps have yield of 65%, 50%, and 70%, respectively.

$^1$H-NMR(300 MHz, CDCl$_3$): δ 1.0(6H, CH$_3$), 1.2(6H, CH$_3$), 1.3(3H, CH$_3$), 1.5(2H, CH), 2.6(1H, CH), 4.3(2H, CH$_2$), 5.3(1H, CH), 7.4-8.0(5H, ArH)

Preparation Example 24

Preparation of ethyl 2-methyl-3-benzoyloxyvalerate

The target product was prepared following the procedure as described in Preparation Example 3, except for that ethyl propionylacetate was used to replace for ethyl acetoacetate as starting material. The three steps have yield of 45%, 60%, and 75%, respectively.

$^1$H-NMR(300 MHz, CDCl$_3$): δ 0.9(3H, CH$_3$), 1.1(H, CH$_3$), 1.7(3H, CH$_3$), 2.5(1H, CH), 4.0(2H, CH$_2$), 5.3(1H, CH), 7.4-8.1(5H, ArH)

Preparation Example 25

Preparation of methyl 2-isobutyl-3-benzoyloxyvalerate

The target product was prepared following the procedure as described in Preparation Example 3, except for that methyl propionylacetate and isobutyl iodide were used to replace for ethyl acetoacetate and methyl iodide, respectively. The three steps have yield of 66%, 55%, and 75%, respectively.

$^1$H-NMR(300 MHz, CDCl$_3$): δ 1.0(6H, CH$_3$), 1.1(3H, CH$_3$), 1.3(4H, CH$_2$), 1.5(1H, CH), 2.6(1H, CH), 4.4(3H, CH$_3$), 5.3(1H, CH), 7.4-8.1(5H, ArH)

Preparation Example 26

Preparation of butyl 4-methyl-3-benzoyloxyvalerate

1) Preparation of butyl 4-methyl-2-acetyl-3-oxo-valerate

Under nitrogen atmosphere, to a reactor was added 0.22 mol of potassium tert-butoxide. After evacuating for 2 hrs, 80 ml of THF was added to dissolve the solid with stirring. Then 0.1 mol of butyl acetoacetate was slowly dropped to the reactor cooled in an ice-water bath, and the reaction was continued for further 2 hrs. Then under cooled in the ice-water bath, 0.12 mol of isobutyryl chloride was slowly dropped, and the reaction was continued for further 1.5 hrs. Next, under cooled in the ice-water bath, water was added to dissolve resultant solid, and the reaction mixture was neutralized with hydrochloric acid. Diethyl ether was used to extract product, and the collected organic layer was dried over anhydrous sodium sulfate. Removing solvent by using a rotatory evaporator gave the product.

2) Preparation of butyl 4-methyl-3-oxo-valerate

To a solution of 42 g of NaOH in 50 ml of ethanol was added 0.1 mol of butyl 4-methyl-2-acetyl-3-oxo-valerate, and the reaction mixture was stirred for 10 hrs. Then to the reaction was added 50 ml of crushed ice, and the mixture was neutralized with hydrochloric acid. Diethyl ether was used to extract product, and the collected organic layer was dried over anhydrous sodium sulfate. The product was obtained by distillation under reduced vacuum.

3) Preparation of butyl 4-methyl-3-benzoyloxyvalerate

The target product was prepared following the procedure as described in Preparation Example 2, except for that butyl 4-methyl-3-oxo-valerate was used to replace for ethyl acetoacetate as starting material. The two steps have yield of 49% and 75%, respectively.

$^1$H-NMR(300 MHz, CDCl$_3$): δ 0.9-1.0(3H, CH$_3$), 1.4-1.5 (6H, CH$_3$), 2.1-2.3(4H, CH$_2$), 2.6-2.7(1H, CH), 3.6-3.7(2H, CH$_2$), 4.3-4.4(2H, CH$_2$), 5.4-5.5(1H, CH), 7.3-8.1(5H, ArH)

Preparation Example 27

Preparation of isobutyl 4-methyl-3-benzoyloxyvalerate

The target product was prepared following the procedure as described in Preparation Example 2, except for that isobutyl 4-methyl-3-oxo-valerate was used to replace for ethyl acetoacetate as starting material. The two steps have yield of 50% and 78%, respectively.

$^1$H-NMR(300 MHz, CDCl$_3$): δ 1.2(6H, CH$_3$), 1.3(6H, CH$_3$), 1.5(2H, CH), 2.6(2H, CH$_2$), 4.3(2H, CH$_2$), 5.3(1H, CH), 7.3-8.1(5H, ArH)

Preparation Example 28

Preparation of ethyl 3-benzoyloxy-2,4,4-trimethylvalerate

The target product was prepared following the procedure as described in Preparation Example 3, except for that ethyl 4,4-dimethyl-3-oxo-valerate was used to replace for ethyl acetoacetate as starting material.

$^1$H-NMR(300 MHz, CDCl$_3$): δ 1.0(9H, CH$_3$), 1.2(6H, CH$_3$), 2.0(2H, CH$_2$), 4.7-4.8(1H, CH), 5.2(1H, CH), 7.3-8.0 (5H, ArH)

Preparation Example 29

Preparation of ethyl 2-isobutyl-3-benzoyloxycaproate

The target product was prepared following the procedure as described in Preparation Example 3, except for that ethyl butyrylacetate and isobutyl iodide were used to replace for ethyl acetoacetate and methyl iodide, respectively. The three steps have yield of 62%, 50%, and 75%, respectively.

$^1$H-B NMR(300 MHz, CDCl$_3$): δ 1.0(6H, CH$_3$), 1.2(6H, CH$_3$), 1.3(4H, CH$_2$), 1.5(1H, CH), 2.6(1H, CH), 4.1(2H, CH$_2$), 5.3(1H, CH), 7.4-8.0(5H, ArH)

Examples 1-29

Preparation of solid catalyst component

To a reactor in which atmosphere was completely replaced with highly pure N$_2$ were added successively 4.8 g of magnesium chloride, 95 ml of toluene, 4 ml of epoxy chloropropane, and 12.5 ml of tributyl phosphate. The mixture was heated to 50° C. with stirring and held at the temperature for 2.5 hours to dissolve the solid completely, then 1.4 g of phthalic anhydride was added and the reaction was continued at the temperature for further one hour. The solution was cooled to below −25° C. and 56 ml of TiCl$_4$ was added dropwise thereto over one hour, then the reaction was heated slowly to 80° C. Solid was precipitated gradually during the heating. To the system were added 6 mmol of dibasic ester compounds synthesized in Preparation Examples 1-29, respectively, and the reaction was held at the temperature for further one hour. After filtering, the residue was washed with 70 ml of toluene for two times. The resulting solid precipitate was treated with 60 ml of toluene and 40 ml of $TiCl_4$ at 100° C. for 2 hours, and after removing the supernatant, the residue was treated with 60 ml of toluene and 40 ml of $TiCl_4$ at 100° C. for 2 hours again. After removing the supernatant, the residue was washed with 60 ml of toluene under boiling state for 5 minutes. After removing the supernatant, the residue was then washed with 60 ml of hexane under boiling state for two times, and 60 ml of hexane at normal temperature for two times, to yield the solid catalyst component.

Comparative Example 1

Catalyst component was prepared following the procedure as described in Examples 1-29, except for that dibutyl phthalate was used to replace for the dibasic esters.

Comparative Example 2

Catalyst component was prepared following the procedure as described in Examples 1-29, except for that 2-iso-propyl-2-isopentyl-1,3-propandiol dibenzoate was used to replace for the dibasic esters.

Propylene polymerization

To a 5L stainless steel autoclave, in which atmosphere had been replaced with propylene gas completely, were added 2.5 mmol of $AlEt_3$, 0.1 mmol of cyclohexylmethyldimethoxysilane (CHMMS), about 10 mg of the solid catalyst component prepared in Examples 1-29 and Comparative Examples 1-2, respectively, and 1.2 L of hydrogen gas, followed by introduction of 2.3 L of liquid propylene. The reactor was heated to 70° C., and the polymerization was performed at that temperature for one hour. After the temperature was reduced and the pressure was relieved, PP powder was removed. Polymerization results were summarized in Table 1 below.

TABLE 1

| Cat. | ED | Ti % | Content of ED % | Activity kgPP/gcat | Isotacticity % | MI g/10 min | DMW Mw/Mn |
|---|---|---|---|---|---|---|---|
| Ex. 1 | ethyl 2-benzyl-3-benzoyloxybutyrate | 2.3 | 12.8 | 23.0 | 93.5 | 5.5 | 8.7 |
| Ex. 2 | ethyl 3-benzoyloxybutyrate | 2.4 | 9.8 | 32.0 | 98.0 | 0.79 | 10.3 |
| Ex. 3 | ethyl 2-methyl-3-benzoyloxybutyrate | 2.3 | 10.6 | 28.4 | 97.6 | 2.7 | 11.0 |
| Ex. 4 | ethyl 2-ethyl-3-benzoyloxybutyrate | 2.4 | 9.6 | 24.0 | 96.3 | 2.3 | 9.1 |
| Ex. 5 | ethyl 2-allyl-3-benzoyloxybutyrate | 2.8 | 9.2 | 16.0 | 94.3 | 4.9 | 8.0 |
| Ex. 6 | ethyl 3-benzoyloxyvalerate | 2.1 | 10.2 | 25.8 | 97.8 | 1.5 | 8.3 |
| Ex. 7 | ethyl 3-benzoyloxycaproate | 2.2 | 9.9 | 20.2 | 97.8 | 2.2 | 6.7 |
| Ex. 8 | ethyl 2-methyl-3-benzoyloxyvalerate | 2.3 | 8.9 | 32.5 | 97.3 | 2.4 | 8.9 |
| Ex. 9 | ethyl 3-acetoxybutyrate | 2.5 | 10.5 | 12.2 | 95.0 | 6.0 | 6.7 |
| Ex. 10 | isobutyl 3-benzoyloxybutyrate | 1.9 | 7.9 | 26.5 | 98.0 | 0.51 | 6.8 |
| Ex. 11 | benzyl 3-benzoyloxybutyrate | 2.9 | 11.0 | 16.6 | 92.5 | 10.6 | 6.5 |
| Ex. 12 | methyl 3-benzoyloxybutyrate | 2.0 | 9.1 | 19.3 | 98.9 | 1.5 | 11.9 |
| Ex. 13 | methyl 2-methyl-3-benzoyloxybutyrate | 2.0 | 8.4 | 25.2 | 97.0 | 1.8 | 8.4 |
| Ex. 14 | Tertbutyl 3-benzoyloxybutyrate | 2.1 | 10.5 | 17.2 | 97.3 | 4.3 | 7.7 |
| Ex. 15 | methyl 2-ethyl-3-benzoyloxybutyrate | 2.6 | 7.8 | 28.4 | 97.3 | 2.2 | 7.6 |
| Ex. 16 | methyl 3-benzoyloxyvalerate | 2.8 | 11.9 | 20.6 | 98.4 | 1.4 | 7.0 |
| Ex. 17 | tertbutyl 2-methyl-3-benzoyloxybutyrate | 2.3 | 9.0 | 19.4 | 92.5 | 8.5 | 7.4 |
| Ex. 18 | Tertbutyl 2-ethyl-3-benzoyloxybutyrate | 1.9 | 8.7 | 12.5 | 94.5 | 4.5 | 8.1 |
| Ex. 19 | ethyl 3-benzoyloxy-4,4-dimethylvalerate | 2.5 | 10.4 | 34.6 | 97.5 | 2.6 | 8.5 |
| Ex. 20 | ethyl 2-methyl-3-(9-fluorenoyloxy)butyrate | 2.6 | 15.3 | 20.6 | 96.1 | 5.2 | 7.0 |
| Ex. 21 | isopropyl 3-benzoyloxybutyrate | 2.4 | 10.4 | 27.2 | 98.2 | 0.37 | 6.4 |
| Ex. 22 | butyl 9-benzoyloxyfluorene-9-carboxylate | 2.5 | 12.3 | 19.2 | 96.3 | 4.2 | 6.3 |
| Ex. 23 | isobutyl 2-iso-butyl-3-benzoyloxybutyrate | 2.1 | 9.1 | 33.3 | 98.0 | 0.61 | 7.2 |
| Ex. 24 | ethyl 2-methyl-3-benzoyloxyvalerate | 2.0 | 8.7 | 33.3 | 97.5 | 2.5 | 8.9 |
| Ex. 25 | methyl 2-iso-butyl-3-benzoyloxyvalerate | 2.2 | 10.4 | 26.0 | 95.7 | 5.7 | 8.2 |
| Ex. 26 | butyl 4-methyl-3-benzoyloxy-valerate | 2.5 | 11.1 | 34.5 | 98.1 | 1.1 | 8.5 |
| Ex. 27 | Isobutyl 4-methyl- 3-benzoyloxy-valerate | 2.0 | 9.2 | 45.7 | 97.9 | 0.43 | 8.3 |
| Ex. 28 | ethyl 2,4,4-trimethyl-3-benzoyloxy-valerate | 2.1 | 8.3 | 27.4 | 97.8 | 3.0 | 6.5 |
| Ex. 29 | ethyl 2-iso-butyl- 3-benzoyloxycaproate | 2.9 | 11.2 | 32.5 | 97.5 | 3.7 | 8.1 |
| Comp. Ex. 1 | Dibutyl phthalate | 1.9 | 9.4 | 35.0 | 98.6 | 3.8 | 5.3 |
| Comp. Ex. 2 | 2-isopropyl-2-isopentyl-1,3-propandiol dibenzonate | 3.1 | 12.4 | 38.5 | 98.1 | 0.12 | 6.5 |

It can be seen from the data shown in Table 1 that polypropylene resins obtained by using catalysts according to the present invention have broader molecular weight distribution, generally larger than 6.5, while the polymer obtained by using catalyst of the prior art containing dibutyl phthalate as internal ED has a value of Mw/Mn of 5.3.

Example 30

To a reactor in which atmosphere was completely replaced with highly pure $N_2$ was added 100 ml of $TiCl_4$. The content was cooled to −20° C., and 7.0 g of $MgCl_2$. 2.6 EtOH spherical support (prepared following the procedure as described in Example 2 of U.S. Pat. No. 4,399,054, except for that the operation was conducted at 2800 rpm rather than 10000 rpm) was added thereto. The temperature was raised to 0° C. over 1 h, then to 20° C. over 2 hrs, then to 40° C. over 1 h. To the reactor was added 6 mmol of dibasic ester compound synthesized in Preparation Example 19, and the reaction was heated to 100° C. over 1 h, and held at the temperature for further 2 hrs. After removing the mother liquid, 100 ml of $TiCl_4$ was added thereto and the reaction was heated to 120° C. over 1 h, and held at the temperature for further 2 hrs. After removing the mother liquid, the residue was then washed with 60 ml of hexane under boiling state for five times, and 60 ml of hexane at normal temperature for three times, to yield 4.9 g of spherical catalyst component.

Propylene polymerization experiment was conducted. The catalyst exhibited an activity of 38.4 kgPP/gcat.hr, and molecular weight distribution (MWD) of the polymer was found as 9.4.

Example 31

Prepolymerization:

To a 250 mL reactor, in which atmosphere was completely replaced with highly pure $N_2$, was added 114 ml of decane, and propylene was introduced until being saturated. Then 600 mg of solid catalyst component prepared in Example 3, 30 ml of 1M solution of triethyl aluminum in decane, and 6 ml of 0.25M solution of cyclohexylmethyldimethoxysilane (CHMDMS) in decane were added thereto. The reaction was conducted at 15° C. and 1 atm pressure with propylene metered into. When predetermined amount of propylene giving desired prepolymerization times (prepolymerization times=weight of introduced propylene/weight of the solid catalyst component) was metered, the introduction of propylene was stopped. Then the resultant suspension was stirred at 15° C. for further 1 hour so that propylene was sufficiently polymerized, to give a catalyst suspension having desired prepolymerization times.

Propylene Polymerization:

To a 5 L stainless steel autoclave, in which atmosphere had been replaced with propylene gas completely, were added 2.5 ml of above prepolymerized catalyst suspension having a prepolymerization times of 2, 1.2 L of hydrogen gas, and 2.3 L of liquid propylene. The reactor was heated to 70° C., and the polymerization was performed at that temperature for one hour. After the temperature was reduced and the pressure was relieved, 302 g of PP powder was removed. The PP resin exhibited an isotacticity of 98.0%, and a molecular weight distribution of 11.5.

Example 32

The procedure as described in Example 31 was followed, except for that prepolymerization times of the prepolymerized catalyst was changed to 10. The propylene polymerization gave 320 g of polymer having a molecular weight distribution of 10.3.

Example 33

Ethylene Polymerization:

To a 2 L stainless steel autoclave, in which atmosphere had been evacuated and replaced with highly pure hydrogen well, were added 1 L of hexane, 10 mg of a solid catalyst component prepared in Example 3 and 2.5 mmol of cocatalyst $AlEt_3$ under $N_2$ atmosphere with stirring. The reactor was heated to 75° C., appropriate amount of highly pure hydrogen was made up to make the fractional pressure of hydrogen in the autoclave being 0.28 MPa, and then ethylene gas was introduced to make its fractional pressure reaching 0.75 MPa. The polymerization reaction was continued for 2 hours at constant temperature of 85° C. and ethylene was made up during the polymerization to maintain the fractional pressure of ethylene unchanged. Then the temperature of the autoclave was reduced, the pressure was relieved and the product was discharged. After removing solvent, the polymer was dried completely, thus 195 g of polyethylene powder having a melt index of 0.9 g/10 min was obtained.

Example 34

Preparation of solid catalyst component

To a reactor in which atmosphere was completely replaced with highly pure $N_2$ were added successively 4.8 g of magnesium chloride, 95 ml of toluene, 4 ml of epoxy chloropropane, 12.5 ml of tributyl phosphate and 0.7 mmol of ethyl 3-benzoyloxybutyrate. The mixture was heated to 50° C. with stirring and held at the temperature for 2.5 hours to dissolve the solid completely, then 1.4 g of phthalic anhydride was added and the reaction was continued at the temperature for further one hour. The solution was cooled to below −25° C. and 56 ml of $TiCl_4$ was added dropwise thereto over one hour, then the reaction was heated slowly to 80° C. Solid was precipitated gradually during the heating. To the system were added 6 mmol of 9,9-di(methoxymethyl)fluorene, and the reaction was held at the temperature for further one hour. After filtering, the residue was washed with 70 ml of toluene for two times. The resulting solid precipitate was treated with 60 ml of toluene and 40 ml of $TiCl_4$ at 100° C. for 2 hours, and after removing the supernatant, the residue was treated with 60 ml of toluene and 40 ml of $TiCl_4$ at 100° C. for 2 hours again. After removing the supernatant, the residue was washed with 60 ml of toluene under boiling state for 5 minutes. After removing the supernatant, the residue was then washed with 60 ml of hexane under boiling state for two times, and 60 ml of hexane at normal temperature for two times, to yield the solid catalyst component.

Propylene polymerization experiment was carried out following the procedure as described for Examples 1-29, and the results were shown in below Table 2.

Example 35

Catalyst component was prepared following the procedure as described in Example 34, except for that isobutyl 3-benzoyloxybutyrate was used to replace for ethyl 3-benzoyloxybutyrate, and 2-isopropyl-2-isopentyl-1,3-dimethoxypropane was used to replace for 9,9-di(methoxymethyl)fluorene.

Propylene polymerization experiment was carried out following the procedure as described for Examples 1-29, and the results were shown in below Table 2.

Example 36

Catalyst component was prepared following the procedure as described in Example 34, except for that 2.0 mmol of ethyl 2-methyl-3-benzoyloxyvalerate was used to replace for 0.7 mmol of ethyl 3-benzoyloxybutyrate.

Propylene polymerization experiment was carried out following the procedure as described for Examples 1-29, and the results were shown in below Table 2.

Example 37

Catalyst component was prepared following the procedure as described in Example 34, except for that ethyl 5-iso-butyl-4-benzoyloxycaproate was used to replace for ethyl 3-benzoyloxybutyrate.

Propylene polymerization experiment was carried out following the procedure as described for Examples 1-29, and the results were shown in below Table 2.

Comparative Example 2

Catalyst component was prepared following the procedure as described in Example 34, except for that ethyl 3-benzoyloxybutyrate was not used.
Propylene polymerization experiment was carried out following the procedure as described for Examples 1-29, and the results were shown in below Table 2.

Comparative Example 3

Catalyst component was prepared following the procedure as described in Example 35, except for that isobutyl 3-benzoyloxybutyrate was not used.
Propylene polymerization experiment was carried out following the procedure as described for Examples 1-29, and the results were shown in below Table 2.

TABLE 2

Polymerization results of the catalysts

| Catalyst | Polymerization Activity KgPP/gcat | MI g/10 min | II % | Mw/Mn |
|---|---|---|---|---|
| Example 34 | 41.9 | 4.1 | 98.9 | 6.8 |
| Example 35 | 39.8 | 4.0 | 99.1 | 6.6 |
| Example 36 | 38.5 | 3.6 | 98.7 | 7.5 |
| Example 37 | 45.8 | 4.1 | 98.5 | 6.4 |
| Comparative Example 2 | 58.1 | 4.2 | 99.2 | 4.0 |
| Comparative Example 3 | 55.4 | 4.5 | 99.5 | 4.1 |

It can be seen from the data shown in Table 2 that polymers obtained by using catalysts according to the present invention, which use two kinds of ED compounds, have remarkably broader molecular weight distribution.

Example 38

Catalyst component was prepared following the procedure as described in Example 34, except for that diisobutyl phthalate was used to replace for 9,9-di(methoxymethyl)fluorene.
Propylene polymerization experiment was carried out following the procedure as described for Examples 1-29, and the results were shown in below Table 3.

Example 39

To a reactor in which atmosphere was completely replaced with highly pure $N_2$ were added successively 4.8 g of magnesium chloride, 95 ml of toluene, 4 ml of epoxy chloropropane, and 12.5 ml of tributyl phosphate. The mixture was heated to 50° C. with stirring and held at the temperature for 2.5 hours to dissolve the solid completely, then 1.4 g of phthalic anhydride was added and the reaction was continued at the temperature for further one hour. The solution was cooled to below −25° C. and 56 ml of $TiCl_4$ was added dropwise thereto over one hour, then the reaction was heated slowly to 80° C. Solid was precipitated gradually during the heating. To the system was added 4.4 mmol of diisobutyl phthalate, and the reaction was held at the temperature for further one hour. After filtering, the residue was washed with 70 ml of toluene for two times. The resulting solid precipitate was treated with 60 ml of toluene, 40 ml of $TiCl_4$ and 2.2 mmol of isobutyl 3-benzoyloxybutyrate at 100° C. for 2 hours. After removing the supernatant, the residue was treated with 60 ml of toluene and 40 ml of $TiCl_4$ at 100° C. for 2 hours. After removing the supernatant, the residue was washed with 60 ml of toluene under boiling state for 5 minutes. After removing the supernatant, the residue was then washed with 60 ml of hexane under boiling state for two times, and 60 ml of hexane at normal temperature for two times, to yield the solid catalyst component.
Propylene polymerization experiment was carried out following the procedure as described for Examples 1-29, and the results were shown in below Table 3.

Comparative Example 4

Catalyst component was prepared following the procedure as described in Example 38, except for that ethyl 3-benzoyloxybutyrate was not used.
Propylene polymerization experiment was carried out following the procedure as described for Examples 1-29, and the results were shown in below Table 3.

TABLE 3

Polymerization results of the catalysts

| Catalyst | Polymerization Activity KgPP/gcat | MI g/10 min | II % | Mw/Mn |
|---|---|---|---|---|
| Example 38 | 45 | 2.7 | 98.2 | 8.0 |
| Example39 | 28 | 2.4 | 98.6 | 6.2 |
| Comparative Example 4 | 33 | 3.2 | 98.8 | 5.0 |

From the comparison of the data shown in Table 3, it can be seen that the use of two kinds of ED compounds in the catalysts according to the present invention do not decrease, but increase in some case, the activity of the catalysts, and the polymers obtained have remarkably broader molecular weight distribution.

What is claimed is:
1. A catalyst component for olefin polymerization, comprising magnesium, titanium, a halogen and an electron donor compound (a), wherein said electron donor compound (a) is at least one selected from the group consisting of dibasic ester compounds of the formula (I):

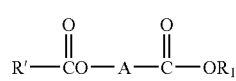

wherein $R_1$ and $R'$ groups, which may be identical or different, are selected from the group consisting of substituted or unsubstituted, $C_1$-$C_{20}$ linear or branched alkyl, $C_3$-$C_{20}$ cycloalkyl, $C_6$-$C_{20}$ aryl, $C_7$-$C_{20}$ alkaryl, $C_7$-$C_{20}$ aralkyl, $C_2$-$C_{10}$ alkenyl, and $C_{10}$-$C_{20}$ condensed aromatic group; A is a bivalent linking group with chain length between two free radicals being 1-10 carbon atoms, where one or more carbon atoms of the bivalent linking group are optionally replaced by a hetero-atom selected from the group consisting of nitrogen, oxygen, sulfur, silicon, and phosphorus, and one or more carbon atoms and optional hetero-atom(s) of the bivalent linking group optionally carry a substituent selected from the group consisting of linear or branched alkyl, cycloalkyl, aryl, alkaryl, aralkyl, alkenyl, condensed aromatic group, and ester group, said substituents having from 1 to 20 carbon atoms, and two or more of said substituents being optionally linked together to form a saturated or unsaturated monocyclic or polycyclic ring.

2. A catalyst component for olefin polymerization according to claim 1, wherein in the formula (I), A is a bivalent linking group with chain length between two free radicals being 1-6 carbon atoms, and carbon atom(s) of the bivalent linking group see optionally carry a substituent selected from the group consisting of linear or branched $C_1$-$C_{10}$ alkyl, $C_3$-$C_{10}$ cycloalkyl, $C_6$-$C_{10}$ aryl, $C_7$-$C_{10}$ alkaryl, $C_7$-$C_{10}$ aralkyl, and $C_2$-$C_{10}$ alkenyl.

3. A catalyst component for olefin polymerization according to claim 1, wherein in the formula (I), $R_1$ and R' groups, which may be identical or different, are selected from the group consisting of substituted or unsubstituted, $C_1$-$C_{10}$ linear or branched alkyl, $C_6$-$C_{10}$ aryl, $C_7$-$C_{10}$ alkaryl, and $C_7$-$C_{10}$ ararkyl.

4. A catalyst component for olefin polymerization according to claim 3, wherein in the formula (I), R' group is selected from the group consisting of $C_6$-$C_{10}$ aryl, $C_7$-$C_{10}$ alkaryl, and $C_7$-$C_{10}$ aralkyl.

5. A catalyst component for olefin polymerization according to claim 3, wherein the electron donor compound (a) is a dibasic ester compounds of formula (II):

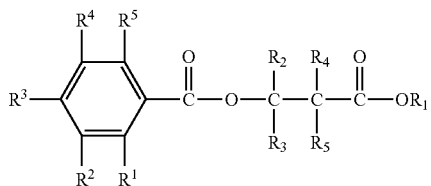

(II)

wherein $R_1$ is $C_1$-$C_{20}$ unsubstituted or halogen-substituted alkyl, or $C_6$-$C_{20}$ unsubstituted or halogen-substituted aryl or alkaryl;

$R_{2-5}$, which may be identical or different, are hydrogen or $C_1$-$C_4$ linear or branched alkyl:

$R^{1-5}$, which may be identical or different, are hydrogen, halogen, $C_1$-$C_{10}$ unsubstituted or halogen-substituted alkyl, or $C_6$-$C_{20}$ a unsubstituted or halogen-substituted aryl or alkaryl or aralkyl, said halogen is selected from the group consisting of F, Cl and Br.

6. A catalyst component for olefin polymerization according to claim 5, wherein in the formula (II), $R_1$ is $C_2$-$C_{10}$ linear or branched alkyl or $C_6$-$C_{20}$ alkaryl.

7. A catalyst component for olefin polymerization according to claim 5, wherein in the formula (II), $R_1$ is $C_2$-$C_6$ linear or branched alkyl.

8. A catalyst component for olefin polymerization according to claim 5, wherein in the formula (II), $R^{1-5}$ groups, which may be identical or different, are hydrogen, or $C_1$-$C_6$ linear or branched, unsubstituted or halogen-substituted alkyl.

9. A catalyst component for olefin polymerization according to claim 1, further comprising an electron donor compound (c) selected from the group consisting of 1,3-diether compounds of formula (IV)

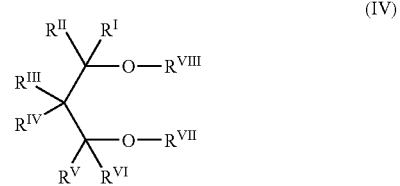

(IV)

wherein $R^I$, $R^{II}$, $R^{III}$, $R^{IV}$, $R^V$ and $R^{VI}$, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl, and $R^{VII}$ and $R^{VIII}$, which may be identical or different, are selected from the group consisting of linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl; and groups $R^I$ to $R^{VI}$ may link each other to form a ring.

10. A catalyst component for olefin polymerization according to claim 9, wherein the electron donor compound (c) is selected from the group consisting of 1,3-diether compounds of formula (VI)

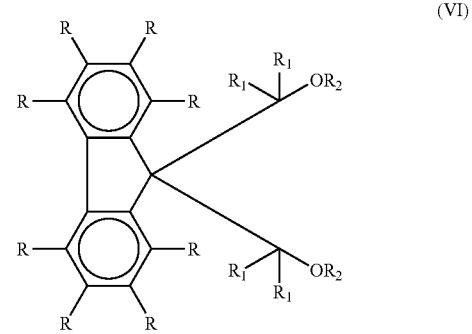

(VI)

wherein R groups, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl.

$R_1$ groups, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl;

$R_2$ groups, which may be identical or different, are selected from the group consisting of linear or branched $C_1$-$C_{20}$ alkyl, $C_3$-$C_{20}$ cycloalkyl, $C_5$-$C_{20}$ aryl, $C_7$-$C_{20}$ alkaryl and $C_7$-$C_{20}$ aralkyl.

11. A catalyst component for olefin polymerization according to claim 9, wherein molar ratio of the electron donor compound (a) to the electron donor compound (a) is In a range of from 0.01 to 100.

12. A catalyst component for olefin polymerization according to claim 11, wherein the molar ratio of the electron donor compound (a) to the electron donor compound (c) is in a range of from 0.05 to 1.

13. A catalyst component for olefin polymerization according to claim 12, wherein the molar ratio of the electron donor compound (a) to the electron donor compound (c) is in a range of from 0.1 to 0.4.

14. A catalyst component for olefin polymerization according to claim 1, further comprising an electron donor compound (b) selected from the group consisting of aliphatic dicarboxylic esters and aromatic dicarboxylic esters.

15. A catalyst component for olefin polymerization according to claim 14, wherein the electron donor compound (b) is selected from the group consisting of dialkyl phthalates.

16. A catalyst component for olefin polymerization according to claim 14, wherein molar ratio of the electron donor compound (a) to the electron donor compound (b) is in a range of from 0.01 to 100.

17. A catalyst component for olefin polymerization according to claim 16, wherein the molar ratio of the electron donor compound (a) to the electron donor compound (b) is in a range of from 0.05 to 1.

18. A catalyst component for olefin polymerization according to claim 17, wherein the molar ratio of the electron donor compound (a) to the electron donor compound (b) is in a range of from 0.1 to 0.3.

19. A catalyst component for olefin polymerization according to claim 1, comprising a reaction product of titanium compound, magnesium compound, the electron donor compound (a), and optional electron donor compound (b) and optional electron donor compound (c), said magnesium compound being selected from the group consisting of magnesium dihalides, magnesium alkoxides, magnesium alkyls, water or alcohol complexes of magnesium dihalides, and derivatives of magnesium dihalides wherein one or two halogen atoms are replaced with alkoxy or halogenated alkoxy, and mixtures thereof;

said titanium compound being represented by a formula of $TiX_n(OR)_{4-n}$, in which R(s) is/are independently hydrocarbyl having from 1 to 20 carbon atoms, X(s) is/are independently halogen, and n is an integer of from 1 to 4.

20. A catalyst component for olefin polymerization according to claim 19, wherein in the course of the preparation of the catalyst component, the magnesium compound used is dissloved in a solvent system comprising an organic epoxy compound and an organo phosphorus compound.

21. A catalyst component for olefin polymerization according to claim 20, wherein the organic epoxy compound is at least one selected from the group consisting of aliphatic epoxy compounds, aliphatic diepoxy compounds, halogenated aliphatic epoxy compounds, halogenated aliphatic diepoxy compounds, glycidyl ethers, and cyclic ethers, each of these compounds having from 2 to 8 carbon atoms.

22. A catalyst component for olefin polymerization according to claim 20, wherein the organo phosphorus compound is selected from the group consisting of hydrocarbyl esters of orthophosphoric acid, hydrocarbyl esters of phosophorous acid, halogenated hydrocarbyl esters of orthophosphoric acid and halogenated hydrocarbyl esters of phosphorous acid.

23. A catalyst component for olefin polymerization according to claim 20, wherein the magnesium compound used is alcohol complexes of magnesium dihalides.

24. A catalyst for polymerization of olefin $CH_2=CHR$, wherein R is hydrogen or $C_1$-$C_{12}$ alkyl or aryl group, comprising a reaction product of the following components:
   (a) the catalyst component according to claim 1;
   (b) an alkyl aluminum compound: and
   (c) optionally, an external electron donor compound.

25. A prepolymerized catalyst for polymerization of olefin $CH_2=CHR$, in which R is hydrogen or $C_1$-$C_{12}$ alkyl or aryl, comprising a prepolymer obtained by prepolymerizing an olefin in the presence of the catalyst according to claim 24, and having 0.1-1000 gram of olelin polymer per gram of solid catalyst component.

26. A process for the polymerization of olefin $CH_2=CHR$, in which R is hydrogen or $C_1$-$C_{12}$ alkyl or aryt group, said process comprising contacting said olefin and optional comonomer with the catalyst according to claim 24, under polymerization conditions.

27. A process for the polymerization of olefin $CH_2=CHR$, in which R is hydrogen or $C_1$-$C_{12}$ alkyl or aryl group, said process comprising contacting said olefin and optional comonomer with the prepolymierzed catalyst according to claim 25, under polymerization conditions.

* * * * *